(12) United States Patent
Kumazawa

(10) Patent No.: US 8,133,546 B2
(45) Date of Patent: Mar. 13, 2012

(54) METHOD FOR PRODUCING ORGANIC THIN FILM BY USING FILM PHYSICAL PROPERTY IMPROVING PROCESS

(75) Inventor: Kazuhisa Kumazawa, Ichihara (JP)

(73) Assignee: Nippon Soda Co., Ltd., Tokyo (JP)

( * ) Notice: Subject to any disclaimer, the term of this patent is extended or adjusted under 35 U.S.C. 154(b) by 561 days.

(21) Appl. No.: 12/309,801

(22) PCT Filed: Jul. 31, 2007

(86) PCT No.: PCT/JP2007/064939
§ 371 (c)(1),
(2), (4) Date: Feb. 5, 2009

(87) PCT Pub. No.: WO2008/016029
PCT Pub. Date: Feb. 7, 2008

(65) Prior Publication Data
US 2009/0258160 A1    Oct. 15, 2009

(30) Foreign Application Priority Data

Jul. 31, 2006   (JP) ................. 2006-209088

(51) Int. Cl.
*B05D 7/24* (2006.01)
*B05D 3/02* (2006.01)
*B05D 3/10* (2006.01)
(52) U.S. Cl. ............... 427/485; 427/301; 427/226
(58) Field of Classification Search ............... None
See application file for complete search history.

(56) References Cited

U.S. PATENT DOCUMENTS

| 5,849,369 A | 12/1998 | Ogawa |
| 6,517,401 B1 | 2/2003 | Ogawa et al. |
| 2005/0167004 A1* | 8/2005 | Kimura et al. ........ 148/249 |

FOREIGN PATENT DOCUMENTS

| EP | 1 484 105 | 12/2004 |
| EP | 1 621 258 | 2/2006 |

(Continued)

OTHER PUBLICATIONS

Search Report, European Patent Application No. EP 07 79 1624, dated Aug. 30, 2010.
Japanese Patent Office, International Search Report (translated) dated Nov. 6, 2007, from related International Patent Application No. PCT/JP2007/064939.

(Continued)

*Primary Examiner* — Necholus Ogden, Jr.
(74) *Attorney, Agent, or Firm* — Kenyon & Kenyon LLP

(57) ABSTRACT

A method is provided for producing an organic thin film on a substrate surface comprising improved heat resistance or durability; said method comprising at least a step (B) of allowing the substrate to contact with an organic solvent solution comprising a metal surfactant having at least one or more hydrolysable group or hydroxyl group, and a catalyst that can interact with the metal surfactant, wherein the method further comprises after step (B), step (E1) of heating the substrate which has been in contact with the organic solvent solution at 100° C. to 150° C.; step (E2) of immersing the substrate which has been in contact with the organic solvent solution in a warm water of 40° C. or more and less than the boiling point; or step (E3) of allowing the substrate which has been in contact with the organic solvent solution to contact with a moisture vapor of 60° C. to 150° C.

24 Claims, 1 Drawing Sheet

FOREIGN PATENT DOCUMENTS

| | | |
|---|---|---|
| GB | 1081111 | 8/1967 |
| JP | 08-337654 | 12/1996 |
| JP | 09-208438 | 8/1997 |
| JP | 2000-053421 | 2/2000 |
| JP | 2005-177533 | 7/2005 |
| JP | 2006-122748 | 5/2006 |
| WO | WO 2005/092516 | 10/2005 |

OTHER PUBLICATIONS

International Preliminary Report on Patentability and Written Opinion of the International Searching Authority (translated) dated Feb. 10, 2009, PCT International Patent Application No. PCT/JP2007/064939.

* cited by examiner

US 8,133,546 B2

METHOD FOR PRODUCING ORGANIC THIN FILM BY USING FILM PHYSICAL PROPERTY IMPROVING PROCESS

This application is a national phase filing (35 U.S.C. §371) OF PCT/JP2007/064939, filed on Jul. 31, 2007, which claims priority under 35 U.S.C. §119 from Japanese application number JP 2006-209088, filed on Jul. 31, 2006.

TECHNICAL FIELD

The present invention relates to a method for producing an organic thin film which film properties such as heat resistance and durability have been improved.

BACKGROUND ART

Conventionally, property modification of a surface of a substrate consisting of glass, metal, plastic or ceramics, is performed in various field, according to its purpose. For example, Patent Document 1 describes a method for producing an organic thin film comprising a step of allowing a substrate to contact with an organic solvent solution comprising a metal compound having a hydrocarbon group, hydrolysable group or hydroxyl group on a metal atom, a metal catalyst and water; wherein the metal compound concentration in the solution is within 5 to 15 mmol/kg, the metal catalyst is within 1 to 20 mol % relative to the metal compound in terms of oxides; and the water concentration in the solution is within 50 to 500 ppm. In such method for producing an organic thin film, after allowing the substrate to contact with an organic solvent solution, the substrate which has been in contact with the organic solvent solution is normally dried, which drying is usually performed at around 60° C. (for example, see [0072] (3) of Patent Document 1).

However, an organic thin film has an excellent utility, while some organic thin films have no sufficient heat resistance or durability. Thus, an excellent organic thin film in which film properties such as heat resistance and durability are further enhanced was strongly awaited.

Patent Document 1: Japanese Laid-Open Patent Application No. 2005-177533

DISCLOSURE OF THE INVENTION

Object to be Solved by the Present Invention

The present invention has been made in view of such circumstances, and it is intended to provide a method for producing an organic thin film with improved film properties such as heat resistance and durability compared to the above-mentioned conventional method.

Means to Solve the Object

The present inventors made a keen study to solve the above objects, and found out that an organic thin film with excellent film properties such as heat resistance and durability can be obtained by a method for producing an organic thin film for forming an organic thin film on a substrate surface, comprising at least a step (B) of allowing the substrate to contact with an organic solvent solution comprising a metal surfactant having at least one or more hydrolysable group or hydroxyl group, and a catalyst that can interact with the metal surfactant, wherein the method further comprises after the step (B), a step (E1) of heating the substrate which has been in contact with the organic solvent solution at 100° C. to 150° C.; a step (E2) of immersing the substrate which has been in contact with the organic solvent solution in a warm water of 40° C. or more and less than the boiling point; or a step (E3) of allowing the substrate which has been in contact with the organic solvent solution to contact with a moisture vapor of 60° C. to 150° C. The present invention has been thus completed.

Specifically, the present invention relates to (1) a method for producing an organic thin film for forming an organic thin film on a substrate surface, comprising at least a step (B) of allowing the substrate to contact with an organic solvent solution comprising a metal surfactant having at least one or more hydrolysable group or hydroxyl group, and a catalyst that can interact with the metal surfactant, wherein the method further comprises after the step B, a step (E1) of heating the substrate which has been in contact with the organic solvent solution at 100° C. to 150° C.; a step (E2) of immersing the substrate which has been in contact with the organic solvent solution in a warm water of 40° C. or more and less than the boiling point; or a step (E3) of allowing the substrate which has been in contact with the organic solvent solution to contact with a moisture vapor of 60° C. to 150° C.; (2) the method for producing an organic thin film according to (1), wherein the range of 60° C. to 150° C. in the step (E3) is a range of 80° C. to 130° C.; (3) the method for producing an organic thin film according to (1), wherein the method further comprises after the step (E2), a step (F2) of heating the substrate that has been immersed in a warm water at 80° C. to 150° C.; (4) the method for producing an organic thin film according to (3), wherein the range of 80° C. to 150° C. in the step (F2) is a range of 100° C. to 130° C.; (5) the method for producing an organic thin film according to any one of (1) to (4), wherein the method further comprises prior to the step (B), a step (A) of performing UV ozone treatment to the substrate; (6) the method for producing an organic thin film according to any one of (1) to (5), wherein the method further comprises after the step (B), and prior to the step (E1), (E2) or (E3), a step (C) of washing the substrate with a hydrocarbonic organic solvent; (7) the method for producing an organic thin film according to (6), wherein the method further comprises between the step (C) and the step (E1), (E2), or (E3), a step (D) of removing the hydrocarbonic organic solvent attached to the substrate; (8) the method for producing an organic film thin film according to any one of (1) to (7), wherein at least one catalyst selected from the group consisting of metal oxide; metal hydroxide; metal alkoxides, chelated or coordinated metal compound, partial hydrolyzed product of metal alkoxides, hydrolyzed product obtained by treating metal alkoxides with water in an amount equivalent to 2-fold or more of the metal alkoxides; organic acids; silanol condensation catalyst and acid catalyst; is used as the catalyst that can interact with the metal surfactant; (9) the method for producing an organic thin film according to (8), wherein at least one or more metal selected from the group consisting of titanium, zirconium, aluminum, silicon, germanium, indium, tin, tantalum, zinc, tungsten, and lead; is used as a metal of metal oxide, metal hydroxide, metal alkoxides, chelated or coordinated metal compounds, partial hydrolyzed product of metal alkoxides, or hydrolyzed product obtained by treating metal alkoxides with water in an amount equivalent to 2-fold or more of the metal alkoxides; (10) the method for producing an organic thin film according to (8) or (9), wherein a product having a property of being dispersed stably without being agglutinated in an organic solvent in the absence of acid, base and/or dispersion stabilizer, is used as a partial hydrolyzed product of metal alkoxides; (11) the method for producing an organic thin film according to any one of (8) to (10), wherein a product obtained by hydrolyzing at a temperature range of −100° C. to the reflux temperature of the organic solvent, by using water in an amount of 0.5 to 2.0-fold mol relative to metal alkoxides in an organic solvent, is used as a partial hydrolyzed product of metal alkoxides; (12) the method for producing an organic thin film according to (8), wherein an organic acid having a pKa level of 1 to 6 is used as organic acid; (13) the method for producing an organic thin film according to any one of (1) to (12), wherein a compound represented by formula (I) is used as a metal surfactant having at least one or more hydrolysable group or hydroxyl group,

(wherein $R^1$ represents a hydrocarbon group optionally having a substituent, a halogenated hydrocarbon group optionally having a substituent, a hydrocarbon group comprising a linking group, or a halogenated hydrocarbon group comprising a linking group; M represents at least one metal atom selected from the group consisting of silicon atom, germanium atom, tin atom, titanium atom and zirconium atom; X represents a hydroxyl group or hydrolysable group; n represents any integer of 1 to (m−1); m represents an atomic valence of M; when n is 2 or more, $R^1$ may be the same or different; when (m−n) is 2 or more, X may be the same or different; with the proviso that at least one X among (m−n)×X is a hydrolysable group or hydroxyl group); (14) the method for producing an organic thin film according to any one of (1) to (12), wherein a compound represented by formula (II) is used as a metal surfactant having at least one or more hydrolysable group or hydroxyl group,

(wherein M represents at least one metal atom selected from the group consisting of silicon atom, germanium atom, tin atom, titanium atom and zirconium atom; X represents a hydroxyl group or hydrolysable group; $R^2$ and $R^3$ independently represent a hydrogen atom or fluorine atom; $R^4$ represents an alkylene group, vinylene group, ethynylene group, arylene group, or a divalent linking group comprising a silicon atom and/or oxygen atom; Y represents a hydrogen atom, alkyl group, alkoxy group, fluorine-containing alkyl group or fluorine-containing alkoxy group; p represents 0 or a positive integer; q represents 0 or 1; r represents an integer of 0 to (m−2); when r is 2 or more, Y may be the same or different; when (m−r−1) is 2 or more, X may be the same or different; with the proviso that at least one X among (m−n−1)×X is a hydrolysable group or hydroxyl group); (15) the method for producing an organic thin film according (13) or (14), wherein X is a hydrolysable group consisting of a halogen atom, C1-C6 alkoxy group, or acyloxy group; (16) the method for producing an organic thin film according to any one of (1) to (15), wherein a hydrocarbonic solvent solution or fluorocarbonic solvent solution is used as an organic solvent solution; (17) the method for producing an organic thin film according to any one (1) to (16), wherein the organic thin film is a crystalline organic thin film; (18) the method for producing an organic thin film according to any one of (1) to (16), wherein the organic thin film is a monomolecular film; (19) the method for producing an organic thin film according to any one of (1) to (16), wherein the organic thin film is a chemisorbed film; (20) the method for producing an organic thin film according to any one of (1) to (16), wherein the organic thin film is a self-assembled film; (21) the method for producing an organic thin film according to any one of (1) to (20), wherein a substrate comprising an active hydrogen on the surface is used as a substrate; (22) the method for producing an organic thin film according to any one of (1) to (21), wherein a substrate consisting of at least one selected from the group consisting of metal, glass, silicon wafer, ceramics, and plastic is used as a substrate; (23) the method for producing an organic thin film according to any one of (1) to (22), wherein the substrate is not crystalline, and the organic thin film is crystalline; (24) the method for producing an organic thin film according to any one of (1) to (23), wherein the step (B) is a step (B') of applying an organic solvent solution comprising a metal surfactant having at least one or more hydrolysable group or hydroxyl group, and a catalyst that can interact with the metal surfactant on the substrate by at least one method selected from dipping method, spin coating method, rolling coating method, Mayer bar method, screen printing method, offset printing method, brush coating method, and spraying method.

BEST MODE FOR CARRYING OUT THE INVENTION

Figure 1:
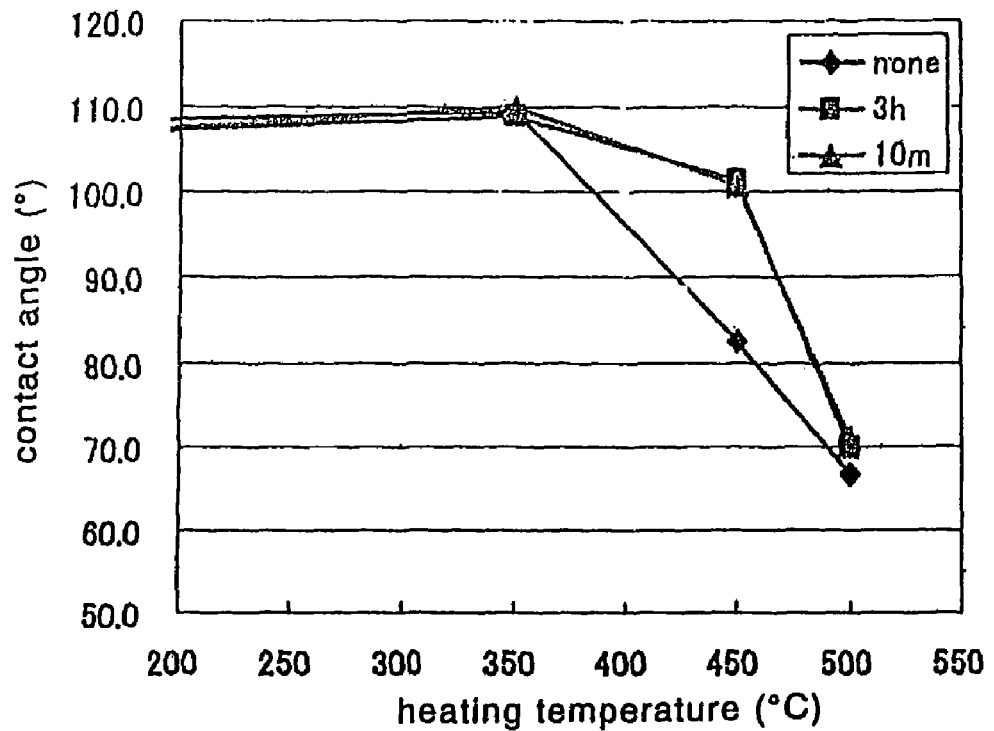
FIG. 1 is a graph showing the change of the contact angle of water on the organic thin film surface, depending on the difference of heating temperature, for the organic thin film obtained in Example B-7. In the graph, "none" denotes untreated, "3 h" denotes a 3 hour-immersion treatment in a warm water of 60° C., and "10 ml" denotes a 10 min-immersion treatment in a warm water of 60° C.

A method for producing an organic thin film of the present invention is not particularly limited as long as it is a method for producing an organic thin film for forming an organic thin film on a substrate surface comprising at least a step (B) of allowing the substrate to contact with an organic solvent solution comprising a metal surfactant having at least one or more hydrolysable group or hydroxyl group, and a catalyst that can interact with the metal surfactant (hereinafter referred to as "the organic solvent solution used in the present invention"), wherein the method further comprises after the step (B), a step (E1) of heating the substrate which has been in contact with the organic solvent solution at 100° C. to 150° C.; a step (E2) of immersing the substrate which has been in contact with the organic solvent solution in a warm water of 40° C. or more and less than the boiling point; or a step (E3) of allowing the substrate which has been in contact with the organic solvent solution to contact with a moisture vapor of 60° C. to 150° C.

(I) Metal Surfactant

A metal surfactant having at least one or more hydrolysable group or hydroxyl group contained in the organic solvent solution used in the present invention, is not particularly limited as long as it has the at least one hydrolysable group or hydroxyl group and a hydrophobic group in the same molecule. However, a metal surfactant having a hydrolysable group or hydroxyl group that can form a linkage by being reacted with active hydrogen on the substrate surface is preferred. Examples of such metal surfactant specifically include a compound represented by the above formula (I).

In the above formula (I), $R^1$ represents a hydrocarbon group optionally having a substituent, a halogenated hydrocarbon group optionally having a substituent, a hydrocarbon group comprising a linking group, or a halogenated hydrocarbon group comprising a linking group.

Examples of the hydrocarbon groups optionally having a substituent include: an alkyl group having 1 to 30 carbons such as methyl group, ethyl group, n-propyl group, isopropyl group, n-butyl group, isobutyl group, sec-butyl group, t-butyl group, n-pentyl group, isopentyl group, neopentyl group, t-pentyl group, n-hexyl group, isohexyl group, n-heptyl group, n-octyl group, and n-decyl group; alkenyl group having 2 to 30 carbons such as vinyl group, propenyl group, butenyl group, and pentenyl group; and aryl group such as phenyl group and naphtyl group.

Examples of halogenated hydrocarbon group of a halogenated hydrocarbon group optionally having a substituent include: a halogenated alkyl group having 1 to 30 carbons, halogenated alkenyl group having 2 to 30 carbons, and halogenated aryl group. Halogen atoms include fluorine atom, chlorine atom, and bromine atom, where fluorine atoms are preferred. Specifically, a group wherein one or more of hydrogen atoms in the above-exemplified hydrocarbon group is substituted with a halogen atom such as fluorine atom, chlorine atom and bromine atom can be exemplified.

Among these, as the above halogenated hydrocarbon group, a group wherein 2 or more hydrogen atoms in the alkyl group having 1 to 30 carbons are substituted with a halogen atom is preferred, and a fluorinated alkyl group wherein 2 or more hydrogen atoms in the alkyl group having 1 to 30 carbons are substituted with a fluorine atom is more preferred. Further, when the fluorinated alkyl group has a branched structure, it is preferred that the branched moiety is a short chain having 1 to 4 carbons, and more preferably having 1 to 2 carbons.

As for a fluorinated alkyl group, a group wherein one or more fluorine atom is bound to the terminal carbon atom is preferred, and a group having a $CF_3$ group moiety in which 3 fluorine atoms are bound to the terminal carbon atom is more preferred. Further, it may be a carbon chain wherein no fluorine atom is substituted at the terminal, and that a fluorine atom is substituted on the internal carbon chain. Particularly preferred is a group having a perfluoroalkyl moiety at the terminal part wherein all the hydrogen atoms in the alkyl group are substituted with fluorine atoms, and having an alkylene group represented by $—(CH_2)_h—$ (wherein h represents an integer of 1 to 6, preferably 2 to 4) between the metal atom M, described in the following.

The number of fluorine atoms in the fluorinated alkyl group is preferred to be 60% or more, more preferably 80% or more, when represented by [(number of fluorine atoms in the fluorinated alkyl group)/(number of hydrogen atoms that can be substituted in the corresponding alkyl group having the same carbon number with the fluorinated alkyl group)×100]%.

As a substituent of the above hydrocarbon group optionally having a substituent, or of the halogenated hydrocarbon group optionally having a substituent, examples include a carboxyl group; amido group; imido group; ester group; alkoxy group such as methoxy group and ethoxy group, or a hydroxyl group. The number of these substituents is preferred to be 0 to 3.

As a hydrocarbon group of a hydrocarbon group comprising a linking group, specific examples include the same groups exemplified as a hydrocarbon group of the above-mentioned hydrocarbon group optionally having a substituent.

As a halogenated hydrocarbon group of a halogenated hydrocarbon group comprising a linking group, specific examples include the same groups exemplified as a halogenated hydrocarbon group of the above-mentioned halogenated hydrocarbon group optionally having a substituent.

The above linking group is preferred to be present between a carbon-carbon bond of the hydrocarbon group or of the halogenated hydrocarbon group; or between a carbon of the hydrocarbon group and metal atom M described in the following.

Specific examples of linking group include: $—O—$, $—S—$, $—SO_2—$, $—CO—$, $—C(=O)O—$, or $—C(=O)NR^{51}—$ (wherein $R^{51}$ represents a hydrogen atom; or an alkyl group such as methyl group, ethyl group, n-propyl group and isopropyl group).

Among these, $R^1$ is preferred to be an alkyl group having 1 to 30 carbons, fluorinated alkyl group having 1 to 30 carbons, or fluorinated alkyl group having a linking group, from the view points of water-repellency and durability.

More preferred examples of $R^1$ include the followings, but are not limited to these: $CH_3—$, $CH_3CH_2—$, $(CH_3)_2CH—$, $(CH_3)_3C—$, $CH_3(CH_2)_2—$, $CH_3(CH_2)_3—$, $CH_3(CH_2)_4—$, $CH_3(CH_2)_5—$, $CH_3(CH_2)_6—$, $CH_3(CH_2)_7—$, $CH_3(CH_2)_8—$, $CH_3(CH_2)_9—$, $CH_3(CH_2)_{10}—$, $CH_3(CH_2)_{11}—$, $CH_3(CH_2)_{12}—$, $CH_3(CH_2)_{13}—$, $CH_3(CH_2)_{14}—$, $CH_3(CH_2)_{15}—$, $CH_3(CH_2)_{16}—$, $CH_3(CH_2)_{17}—$, $CH_3(CH_2)_{18}—$, $CH_3(CH_2)_{19}—$, $CH_3(CH_2)_{20}—$, $CH_3(CH_2)_{21}—$, $CH_3(CH_2)_{22}—$, $CH_3(CH_2)_{23}—$, $CH_3(CH_2)_{24}—$, $CH_3(CH_2)_{25}—$, $CF_3—$, $CF_3CF_2—$, $(CF_3)_2CF—$, $(CF_3)_3C—$, $CF_3(CH_2)_2—$, $CF_3(CF_2)_3(CH_2)_2—$, $CF_3(CF_2)_5(CH_2)_2—$, $CF_3(CF_2)_7(CH_2)_2—$, $CF_3(CF_2)_3(CH_2)_3—$, $CF_3(CF_2)_5(CH_2)_3—$, $CF_3(CF_2)_7(CH_2)_3—$, $CF_3(CF_2)_4O(CF_2)_2(CH_2)_2—$, $CF_3(CF_2)_4O(CF_2)_2(CH_2)_3—$, $CF_3(CF_2)_7O(CF_2)_2(CH_2)_2—$, $CF_3(CF_2)_7CONH(CH_2)_2—$, $CF_3(CF_2)_7CONH(CH_2)_3—$, $CF_3(CF_2)_3O[CF(CF_3)CF(CF_3)O]_2CF(CF_3)CONH(CH_2)_3—$, $CH_3(CF_2)_7(CH_2)_2—$, $CH_3(CF_2)_8(CH_2)_2—$, $CH_3(CF_2)_9(CH_2)_2—$, $CH_3(CF_2)_{10}(CH_2)_2—$, $CH_3(CF_2)_{11}(CH_2)_2—$, $CH_3(CF_2)_{12}(CH_2)_2—$, $CH_3(CF_2)_7(CH_2)_3—$, $CH_3(CF_2)_9(CH_2)_3—$, $CH_3(CF_2)_{11}(CH_2)_3—$, $CH_3CH_2(CF_2)_6(CH_2)_2—$, $CH_3CH_2(CF_2)_8(CH_2)_2—$, $CH_3CH_2(CF_2)_{10}(CH_2)_2—$, $CH_3(CF_2)_4O(CF_2)_2(CH_2)_2—$, $CH_3(CF_2)_7(CH_2)_2O(CH_2)_3—$, $CH_3(CF_2)_8(CH_2)_2O(CH_2)_3—$, $CH_3(CF_2)_9(CH_2)_2O(CH_2)_3—$, $CH_3CH_2(CF_2)_6(CH_2)_2O(CH_2)_3—$, $CH_3(CF_2)_6CONH(CH_2)_3—$, $CH_3(CF_2)_8CONH(CH_2)_3—$, $CH_3(CF_2)_3O[CF(CF_3)CF(CF_3)O]_2CF(CF_3)CONH(CH_2)_3—$.

M represents one kind of atom selected from the group consisting of silicon atom, germanium atom, tin atom, titanium atom and zirconium atom. Among these, silicon atom is particularly preferred from the view points of easiness to obtain the raw material, reactivity etc.

X represents a hydroxyl group or a hydrolysable group, and the hydrolysable group is not particularly limited as long as it is a group that degrades by reacting with water. Specific examples include an alcoxy group having 1 to 6 carbons optionally having a substituent; a hydrocarbon oxy group optionally having a substituent; acyloxy group optionally having a substituent; halogen atom such as fluorine atom, chlorine atom, bromine atom and iodine atom; isocyanate group; cyano group; amino group; or amido group.

Particularly, as an alkoxy group having 1 to 6 carbons optionally having a substituent, an alicyclic or aromatic hydrocarbon oxy group such as alkenyloxy group and aralkyloxy group, or acyloxy group such as acetoxy group is preferred.

Examples of alkoxy group having 1 to 6 carbons include methoxy group, ethoxy group, n-propoxy group, isopropoxy group, n-butoxy group, sec-butoxy group, n-pentyloxy group, and n-hexyloxy group.

Examples of acyloxy group include: acetoxy group, propionyloxy group, propanoyloxy group, n-propylcarbonyloxy group, isopropylcarbonyloxy group, n-butylcarbonyloxy group, propanoyloxy group, alicyclic hydrocarbon oxy group; cyclopropyloxy group, cyclopropyl methyloxy, cyclohexyl group, norbonyloxy group, etc., alkenyloxy group; allyloxy group, etc., alkynyloxy group; propargyloxy group, etc., aralkyloxy group; vinyloxy group, benzyloxy group, phenethyloxy group, etc., aromatic hydrocarbon oxy group; phenoxy group, naphtyloxy group, etc., benzoyloxy group, etc.

As substituents thereof, carboxyl group, amido group, imido group, ester group, hydroxyl group and the like can be exemplified. Among these, hydroxyl group, halogen atom, alkoxy group, acyloxy group, or isocyanate group with 1 to 6 carbons are preferred as X, and alkoxy group or acyloxy group with 1 to 4 carbons are more preferred.

m represents a valence of metal atom M.

n represents any integer of 1 to (m−1). It is preferred that n is 1 when producing an organic thin film of a high density.

When n is 2 or more, $R^1$ may be the same or different.

Further, when (m−n) is 2 or more, X may be the same or different, but at least one X among the (m−n)×X is a hydrolysable group or hydroxyl group.

Among the compounds represented by formula (I), as one preferred embodiment, a compound represented by formula (II) can be exemplified. In formula (II), $R^4$ represents an alkylene group, vinylene group, ethynylene group, arylene group, or a divalent functional group comprising a silicon atom and/or oxygen atom. Specifically, a functional group represented by the following formula can be exemplified.

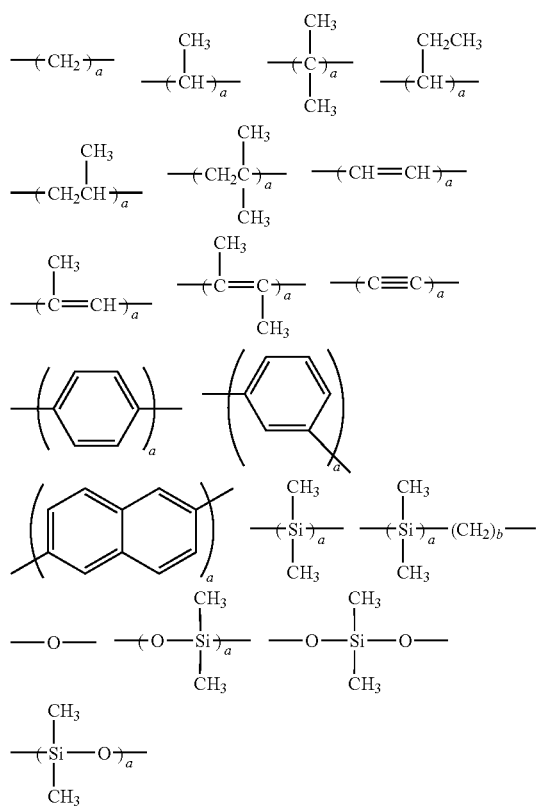

In the above formulae, a and b represent any positive integer of 1 or more.

In formula (II), Y represents a hydrogen atom; alkyl group including methyl group, ethyl group, n-propyl group, isopropyl group, n-butyl group, isobutyl group, sec-butyl group, t-butyl group, n-pentyl group, isopentyl group, neopentyl group, t-pentyl group, n-hexyl group, and isohexyl group; alkoxy group including methoxy group, ethoxy group, n-propoxy group, isopropoxy group, n-butoxy group, sec-butoxy group, t-butoxy group, and n-pentyloxy group, n-hexyloxy group; fluorine-containing alkyl group wherein a part or all of the hydrogen atoms in the alkyl group is substituted with a fluorine atom; or fluorine-containing alkoxy group wherein a part or all of the hydrogen atoms in the alkoxy group is substituted with a fluorine atom; etc.

In formula (II), r represents an integer of 0 or 1 to (m−2), and it is preferred that r is 0 when producing an adsorbed film of high density. When r is 2 or more, each Y may be the same or different, and when (m−r−1) is 2 or more, each X may be the same or different. However, at least one X among the (m−r−1)×X is a hydrolysable group or hydroxyl group.

As a compound represented by formula (I), the following can be exemplified as one of preferred embodiment, beside the compounds represented by formula (II):

$$CH_3-(CH_2)_g-MY_rX_{m-r-1} \qquad (1)$$

$$CH_3-(CH_2)_s-O-(CH_2)_t-MY_rX_{m-r-1} \qquad (2)$$

$$CH_3-(CH_2)_u-Si(CH_3)_2-(CH_2)_v-MY_rX_{m-r-1} \qquad (3)$$

$$CF_3COO-(CH_2)_w-MY_rX_{m-r-1} \qquad (4)$$

In the above formulae, g, S, t, u, v and w represent any integer, while as a particularly preferred range, the following can be exemplified: g is 1 to 25, s is 0 to 12, t is 1 to 20, u is 0 to 12, v is 1 to 20, and w is 1 to 25.

M, Y, X, r and m have the same meaning as in the formula (II).

Specific examples of a compound represented by formula (I) include the following.

In the following, a compound wherein metal atom M is a silicon atom is shown as a representative example, while the present invention is not limited to these. Further, hydrolysable groups are not limited to the exemplified functional groups, and may be other hydrolysable groups bound with other hydrolysable groups.

$CH_3CH_2O(CH_2)_{15}Si(OCH_3)_3$
$CF_3CH_2O(CH_2)_{15}Si(OCH_3)_3$
$CH_3(CH_2)_2Si(CH_3)_2(CH_2)_{15}Si(OCH_3)_3$
$CH_3(CH_2)_6Si(CH_3)_2(CH_2)_9Si(OCH_3)_3$
$CH_3COO(CH_2)_{15}Si(OCH_3)_3$
$CF_3(CF_2)_5(CH_2)_2Si(OCH_3)_3$
$CF_3(CF_2)_7-(CH=CH)_3-Si(OCH_3)_3$
$CH_3CH_2O(CH_2)_{15}Si(OC_2H_5)_3$
$CH_3(CH_2)_2Si(CH_3)_2(CH_2)_{15}Si(OC_2H_5)_3$
$CH_3(CH_2)_6Si(CH_3)_2(CH_2)_9Si(OC_2H_5)_3$
$CF_3(CH_2)_6Si(CH_3)_2(CH_2)_9Si(OC_2H_5)_3$
$CH_3COO(CH_2)_{15}Si(OC_2H_5)_3$
$CF_3COO(CH_2)_{15}Si(OC_2H_5)_3$
$CF_3COO(CH_2)_{15}Si(OCH_3)_3$
$CF_3(CF_2)_9(CH_2)_2Si(OC_2H_5)_3$
$CF_3(CF_2)_7(CH_2)_2Si(OC_2H_5)_3$
$CF_3(CF_2)_5(CH_2)_2Si(OC_2H_5)_3$
$CF_3(CF_2)_7(CH=CH)_3Si(OC_2H_5)_3$
$CF_3(CF_2)_9(CH_2)_2Si(OCH_3)_3$
$CF_3(CF_2)_5(CH_2)_2Si(OCH_3)_3$
$CF_3(CF_2)_7(CH_2)_2Si(CH_3)(OC_2H_5)_2$
$CF_3(CF_2)_7(CH_2)_2Si(CH_3)(OCH_3)_2$
$CF_3(CF_2)_7(CH_2)_2Si(CH_3)_2(OC_2H_5)$
$CF_3(CF_2)_7(CH_2)_2Si(CH_3)_2(OCH_3)$
$CF_3(CH_2)_2Si(OCH_3)_3$

CF$_3$(CF$_2$)$_3$(CH$_2$)$_2$Si(OCH$_3$)$_3$
CF$_3$(CF$_2$)$_5$(CH$_2$)$_2$Si(OCH$_3$)$_3$
CF$_3$(CF$_2$)$_7$(CH$_2$)$_2$Si(OCH$_3$)$_3$
CF$_3$(CF$_2$)$_3$(CH$_2$)$_3$Si(OCH$_3$)$_3$
CF$_3$(CF$_2$)$_5$(CH$_2$)$_3$Si(OCH$_3$)$_3$
CF$_3$(CF$_2$)$_7$(CH$_2$)$_3$Si(OCH$_3$)$_3$
CF$_3$(CF$_2$)$_4$O(CF$_2$)$_2$(CH$_2$)$_2$Si(OCH$_3$)$_3$
CF$_3$(CF$_2$)$_4$O(CF$_2$)$_2$(CH$_2$)$_3$Si(OCH$_3$)$_3$
CF$_3$(CF$_2$)$_7$(CH$_2$)$_2$O(CH$_2$)$_3$Si(OCH$_3$)$_3$
CF$_3$(CF$_2$)$_7$CONH(CH$_2$)$_2$Si(OCH$_3$)$_3$
CF$_3$(CF$_2$)$_7$CONH(CH$_2$)$_3$Si(OCH$_3$)$_3$
CF$_3$(CF$_2$)$_3$O[CF(CF$_3$)CF(CF$_3$)O]$_2$CF(CF$_3$)—CONH(CH$_2$)$_3$Si(OCH$_3$)$_3$
CF$_3$(CF$_2$)$_3$(CH$_2$)$_2$Si(CH$_3$)(OCH$_3$)$_2$
CF$_3$(CF$_2$)$_5$(CH$_2$)$_2$Si(CH$_3$)(OCH$_3$)$_2$
CF$_3$(CH$_2$)$_2$Si(CH$_3$)(OCH$_3$)$_2$
CF$_3$(CF$_2$)$_3$(CH$_2$)$_3$Si(CH$_3$)(OCH$_3$)$_2$
CF$_3$(CF$_2$)$_5$(CH$_2$)$_3$Si(CH$_3$)(OCH$_3$)$_2$
CF$_3$(CF$_2$)$_7$(CH$_2$)$_3$Si(CH$_3$)(OCH$_3$)$_2$
CF$_3$(CF$_2$)$_4$(CF$_2$)$_2$(CH$_2$)$_2$Si(CH$_3$)(OCH$_3$)$_2$
CF$_3$(CF$_2$)$_4$(CF$_2$)$_2$(CH$_2$)$_3$Si(CH$_3$)(OCH$_3$)$_2$
CF$_3$(CF$_2$)$_4$(CH$_2$)$_2$O(CH$_2$)$_3$Si(CH$_3$)(OCH$_3$)$_2$
CF$_3$(CF$_2$)$_7$CONH(CH$_2$)$_2$Si(CH$_3$)(OCH$_3$)$_2$
CF$_3$(CF$_2$)$_7$CONH(CH$_2$)$_3$Si(CH$_3$)(OCH$_3$)$_2$
CF$_3$(CF$_2$)$_3$O[CF(CF$_3$)CF(CF$_3$)O]$_2$CF(CF$_3$)—CONH(CH$_2$)$_3$Si(CH$_3$)(OCH$_3$)$_2$
CH$_3$(CH$_2$)$_7$Si(OCH$_3$)$_3$
CH$_3$(CF$_2$)$_7$(CH$_2$)$_2$Si(OCH$_3$)$_3$
CH$_3$(CF$_2$)$_7$(CH$_2$)$_2$Si(CH$_3$)(OCH$_3$)$_2$
CH$_3$(CF$_2$)$_7$(CH$_2$)$_2$Si(OCH$_3$)$_3$
CH$_3$(CF$_2$)$_7$(CH$_2$)$_2$Si(NCO)$_3$
CH$_3$(CF$_2$)$_8$(CH$_2$)$_2$Si(OCH$_3$)$_3$
CH$_3$(CF$_2$)$_8$(CH$_2$)$_2$Si(NCO)$_3$
CH$_3$(CF$_2$)$_9$(CH$_2$)$_2$Si(OCH$_3$)$_3$
CH$_3$(CF$_2$)$_9$(CH$_2$)$_2$Si(NCO)$_3$
CH$_3$CH$_2$(CF$_2$)$_6$(CH$_2$)$_2$Si(OCH$_3$)$_3$
CH$_3$CH$_2$(CF$_2$)$_6$(CH$_2$)$_2$Si(NCO)$_3$
CH$_3$CH$_2$(CF$_2$)$_8$(CH$_2$)$_2$Si(OCH$_3$)$_3$
CH$_3$CH$_2$(CF$_2$)$_8$(CH$_2$)$_2$Si(NCO)$_3$
CH$_3$CH$_2$(CF$_2$)$_{10}$(CH$_2$)$_2$Si(OCH$_3$)$_3$
CH$_3$(CF$_2$)$_4$O(CF$_2$)$_2$(CH$_2$)$_2$Si(OCH$_3$)$_3$
CH$_3$(CF$_2$)$_7$(CH$_2$)$_2$O(CH$_2$)$_3$Si(OCH$_3$)$_3$
CH$_3$(CF$_2$)$_9$(CH$_2$)$_2$O(CH$_2$)$_3$Si(OCH$_3$)$_3$
CH$_3$(CF$_2$)$_9$(CH$_2$)$_2$O(CH$_2$)$_3$Si(OCH$_3$)$_3$
CH$_3$CH$_2$(CF$_2$)$_6$(CH$_2$)$_2$O(CH$_2$)$_3$Si(OCH$_3$)$_3$
CH$_3$(CF$_2$)$_6$CONH(CH$_2$)$_3$Si(OCH$_3$)$_3$
CH$_3$(CF$_2$)$_8$CONH(CH$_2$)$_3$Si(OCH$_3$)$_3$
CH$_3$(CF$_2$)$_3$O[CF(CF$_3$)CF(CF$_3$)O]$_2$CF(CF$_3$)—CONH(CH$_2$)$_3$Si(OCH$_3$)$_3$
CH$_3$CH$_2$O(CH$_2$)$_{15}$Si(OCH$_3$)(OH)$_2$
CF$_3$CH$_2$O(CH$_2$)$_{15}$Si(OCH$_3$)$_1$(OH)$_2$
CH$_3$(CH$_2$)$_2$Si(CH$_3$)$_2$(CH$_2$)$_{15}$Si(OCH$_3$)(OH)$_2$
CH$_3$(CH$_2$)$_6$Si(CH$_3$)$_2$(CH$_2$)$_9$Si(OCH$_3$)(OH)$_2$
CH$_3$COO(CH$_2$)$_{15}$Si(OCH$_3$)(OH)$_2$
CF$_3$(CF$_2$)$_5$(CH$_2$)$_2$Si(OCH$_3$)(OH)$_2$
CF$_3$(CF$_2$)$_7$(CH=CH)$_3$Si(OCH$_3$)(OH)$_2$
CH$_3$CH$_2$O(CH$_2$)$_{15}$Si(OC$_2$H$_5$)(OH)$_2$
CH$_3$(CH$_2$)$_2$Si(CH$_3$)$_2$(CH$_2$)$_{15}$Si(OC$_2$H$_5$)(OH)$_2$
CH$_3$(CH$_2$)$_6$Si(CH$_3$)$_2$(CH$_2$)$_9$Si(OC$_2$H$_5$)(OH)$_2$
CF$_3$(CH$_2$)$_6$Si(CH$_3$)$_2$(CH$_2$)$_9$Si(OC$_2$H$_5$)(OH)$_2$
CH$_3$COO(CH$_2$)$_{15}$Si(OC$_2$H$_5$)(OH)$_2$
CF$_3$COO(CH$_2$)$_{15}$Si(OC$_2$H$_5$)(OH)$_2$
CF$_3$COO(CH$_2$)$_{15}$Si(OCH$_3$)(OH)$_2$
CF$_3$(CF$_2$)$_9$(CH$_2$)$_2$Si(OC$_2$H$_5$)(OH)$_2$
CF$_3$(CF$_2$)$_7$(CH$_2$)$_2$Si(OC$_2$H$_5$)(OH)$_2$
CF$_3$(CF$_2$)$_5$(CH$_2$)$_2$Si(OC$_2$H$_5$)(OH)$_2$
CF$_3$(CF$_2$)$_7$(CH=CH)$_3$Si(OC$_2$H$_5$)(OH)$_2$

CF$_3$(CF$_2$)$_9$(CH$_2$)$_2$Si(OCH$_3$)(OH)$_2$
CF$_3$(CF$_2$)$_5$(CH$_2$)$_2$Si(OCH$_3$)(OH)$_2$
CF$_3$(CF$_2$)$_7$(CH$_2$)$_2$Si(CH$_3$)(OH)$_2$
CF$_3$(CF$_2$)$_9$(CH$_2$)$_2$Si(CH$_3$)(OH)$_2$
CH$_3$CH$_2$O(CH$_2$)$_{15}$Si(OCH$_3$)$_2$(OH)
CF$_3$CH$_2$O(CH$_2$)$_{15}$Si(OCH$_3$)$_2$(OH)
CH$_3$(CH$_2$)$_2$Si(CH$_3$)$_2$(CH$_2$)$_{15}$Si(OCH$_3$)$_2$(OH)
CH$_3$(CH$_2$)$_6$Si(CH$_3$)$_2$(CH$_2$)$_9$Si(OCH$_3$)$_2$(OH)
CH$_3$COO(CH$_2$)$_{15}$Si(OCH$_3$)$_2$(OH)
CF$_3$(CF$_2$)$_5$(CH$_2$)$_2$Si(OCH$_3$)$_2$(OH)
CH$_3$CH$_2$O(CH$_2$)$_{15}$Si(OC$_2$H$_5$)$_2$(OH)
CF$_3$(CF$_2$)$_7$(CH=CH)$_3$Si(OCH$_3$)$_2$(OH)
CH$_3$(CH$_2$)$_2$Si(CH$_3$)$_2$(CH$_2$)$_{15}$Si(OC$_2$H$_5$)$_2$(OH)
CH$_3$(CH$_2$)$_6$Si(CH$_3$)$_2$(CH$_2$)$_9$Si(OC$_2$H$_5$)$_2$(OH)
CF$_3$(CH$_2$)$_6$Si(CH$_3$)$_2$(CH$_2$)$_9$Si(OC$_2$H$_5$)$_2$(OH)
CH$_3$COO(CH$_2$)$_{15}$Si(OC$_2$H$_5$)$_2$(OH)
CF$_3$COO(CH$_2$)$_{15}$Si(OC$_2$H$_5$)$_2$(OH)
CF$_3$COO(CH$_2$)$_{15}$Si(OCH$_3$)$_2$(OH)
CF$_3$(CF$_2$)$_9$(CH$_2$)$_2$Si(OC$_2$H$_5$)$_2$(OH)
CF$_3$(CF$_2$)$_7$(CH$_2$)$_2$Si(OC$_2$H$_5$)$_2$(OH)
CF$_3$(CF$_2$)$_5$(CH$_2$)$_2$Si(OC$_2$H$_5$)$_2$(OH)
CF$_3$(CF$_2$)$_7$(CH=CH)$_3$Si(OC$_2$H$_5$)$_2$(OH)
CF$_3$(CF$_2$)$_9$(CH$_2$)$_2$Si(OCH$_3$)$_2$(OH)
CF$_3$(CF$_2$)$_5$(CH$_2$)$_2$Si(OCH$_3$)$_2$(OH)
CF$_3$(CF$_2$)$_7$(CH$_2$)$_2$Si(CH$_3$)(OC$_2$H$_5$)(OH)
CF$_3$(CF$_2$)$_7$(CH$_2$)$_2$Si(CH$_3$)(OCH$_3$)(OH)
CF$_3$(CH$_2$)$_2$Si(OCH$_3$)(OH)$_2$
CF$_3$(CF$_2$)$_3$(CH$_2$)$_2$Si(OCH$_3$)(OH)$_2$
CF$_3$(CF$_2$)$_5$(CH$_2$)$_2$Si(OCH$_3$)(OH)$_2$
CF$_3$(CF$_2$)$_7$(CH$_2$)$_2$Si(OCH$_3$)(OH)$_2$
CF$_3$(CF$_2$)$_3$(CH$_2$)$_3$Si(OCH$_3$)(OH)$_2$
CF$_3$(CF$_2$)$_5$(CH$_2$)$_3$Si(OCH$_3$)(OH)$_2$
CF$_3$(CF$_2$)$_7$(CH$_2$)$_3$Si(OCH$_3$)(OH)$_2$
CF$_3$(CF$_2$)$_4$O(CF$_2$)$_2$(CH$_2$)$_2$Si(OCH$_3$)(OH)$_2$
CF$_3$(CF$_2$)$_4$O(CF$_2$)$_2$(CH$_2$)$_3$Si(OCH$_3$)(OH)$_2$
CF$_3$(CF$_2$)$_7$(CH$_2$)$_2$O(CH$_2$)$_3$Si(OCH$_3$)(OH)$_2$
CF$_3$(CF$_2$)$_7$CONH(CH$_2$)$_2$Si(OCH$_3$)(OH)$_2$
CF$_3$(CF$_2$)$_7$CONH(CH$_2$)$_3$Si(OCH$_3$)(OH)$_2$
CF$_3$(CF$_2$)$_3$O[CF(CF$_3$)CF(CF$_3$)O]$_2$CF(CF$_3$)CONH(CH$_2$)$_3$Si(OCH$_3$)(OH)$_2$
CF$_3$(CH$_2$)$_2$Si(OCH$_3$)$_2$(OH)
CF$_3$(CF$_2$)$_3$(CH$_2$)$_2$Si(OCH$_3$)$_2$(OH)
CF$_3$(CF$_2$)$_5$(CH$_2$)$_2$Si(OCH$_3$)$_2$(OH)
CF$_3$(CF$_2$)$_7$(CH$_2$)$_2$Si(OCH$_3$)$_2$(OH)
CF$_3$(CF$_2$)$_3$(CH$_2$)$_3$Si(OCH$_3$)$_2$(OH)
CF$_3$(CF$_2$)$_5$(CH$_2$)$_3$Si(OCH$_3$)$_2$(OH)
CF$_3$(CF$_2$)$_7$(CH$_2$)$_3$Si(OCH$_3$)$_2$(OH)
CF$_3$(CF$_2$)$_4$O(CF$_2$)$_2$(CH$_2$)$_2$Si(OCH$_3$)$_2$(OH)
CF$_3$(CF$_2$)$_4$O(CF$_2$)$_2$(CH$_2$)$_3$Si(OCH$_3$)$_2$(OH)
CF$_3$(CF$_2$)$_7$(CH$_2$)$_2$O(CH$_2$)$_3$Si(OCH$_3$)$_2$(OH)
CF$_3$(CF$_2$)$_7$CONH(CH$_2$)$_2$Si(OCH$_3$)$_2$(OH)
CF$_3$(CF$_2$)$_7$CONH(CH$_2$)$_3$Si(OCH$_3$)$_2$(OH)
CF$_3$(CF$_2$)$_3$O[CF(CF$_3$)CF(CF$_3$)O]$_2$CF(CF$_3$)CONH(CH$_2$)$_3$Si(OCH$_3$)$_2$(OH)
CH$_3$(CH$_2$)$_7$Si(OCH$_3$)(OH)$_2$
CH$_3$(CF$_2$)$_7$(CH$_2$)$_2$Si(OCH$_3$)(OH)$_2$
CH$_3$(CF$_2$)$_7$(CH$_2$)$_2$Si(NCO)(OH)$_2$
CH$_3$(CF$_2$)$_8$(CH$_2$)$_2$Si(OCH$_3$)(OH)$_2$
CH$_3$(CF$_2$)$_8$(CH$_2$)$_2$Si(NCO)(OH)$_2$
CH$_3$(CF$_2$)$_9$(CH$_2$)$_2$Si(OCH$_3$)(OH)$_2$
CH$_3$(CF$_2$)$_9$(CH$_2$)$_2$Si(NCO)(OH)$_2$
CH$_3$CH$_2$(CF$_2$)$_6$(CH$_2$)$_2$Si(OCH$_3$)(OH)$_2$
CH$_3$CH$_2$(CF$_2$)$_6$(CH$_2$)$_2$Si(OCH$_3$)(OH)$_2$
CH$_3$CH$_2$(CF$_2$)$_6$(CH$_2$)$_2$Si(NCO)(OH)$_2$
CH$_3$CH$_2$(CF$_2$)$_8$(CH$_2$)$_2$Si(OCH$_3$)(OH)$_2$
CH$_3$CH$_2$(CF$_2$)$_8$(CH$_2$)$_2$Si(NCO)(OH)$_2$
CH$_3$CH$_2$(CF$_2$)$_{10}$(CH$_2$)$_2$Si(OCH$_3$)(OH)$_2$

CH₃(CF₂)₄O(CF₂)₂(CH₂)₂Si(OCH₃)(OH)₂
CH₃(CF₂)₇(CH₂)₂O(CH₂)₃Si(OCH₃)(OH)₂
CH₃(CF₂)₈(CH₂)₂O(CH₂)₃Si(OCH₃)(OH)₂
CH₃(CF₂)₉(CH₂)₂O(CH₂)₃Si(OCH₃)(OH)₂
CH₃CH₂(CF₂)₆(CH₂)₂O(CH₂)₃Si(OCH₃)(OH)₂
CH₃(CF₂)₆CONH(CH₂)₃Si(OCH₃)(OH)₂
CH₃(CF₂)₈CONH(CH₂)₃Si(OCH₃)(OH)₂
CH₃(CF₂)₃O[CF(CF₃)CF(CF₃)O]₂CF(CF₃)CONH(CH₂)₃Si(OCH₃)(OH)₂
CF₃(CF₂)₃(CH₂)₂Si(CH₃)(OCH₃)(OH)
CF₃(CF₂)₅(CH₂)₂Si(CH₃)(OCH₃)(OH)
CF₃(CH₂)₂Si(CH₃)(OCH₃)(OH)
CF₃(CF₂)₃(CH₂)₃Si(CH₃)(OCH₃)(OH)
CF₃(CF₂)₅(CH₂)₃Si(CH₃)(OCH₃)(OH)
CF₃(CF₂)₇(CH₂)₃Si(CH₃)(OCH₃)(OH)
CF₃(CF₂)₄(CF₂)₂(CH₂)₂Si(CH₃)(OCH₃)(OH)
CF₃(CF₂)₄(CF₂)₂(CH₂)₃Si(CH₃)(OCH₃)(OH)
CF₃(CF₂)₄(CH₂)₂O(CH₂)₃Si(CH₃)(OCH₃)(OH)
CF₃(CF₂)₇CONH(CH₂)₂Si(CH₃)(OCH₃)(OH)
CF₃(CF₂)₇CONH(CH₂)₃Si(CH₃)(OCH₃)(OH)
CF₃(CF₂)₃O[CF(CF₃)CF(CF₃)O]₂CF(CF₃)CONH(CH₂)₃Si(CH₃)(OCH₃)(OH)
CH₃(CH₂)₇Si(OCH₃)₂(OH)
CH₃(CF₂)₇(CH₂)₂Si(OCH₃)₂(OH)
CH₃(CF₂)₇(CH₂)₂Si(CH₃)(OCH₃)(OH)
CH₃(CF₂)₇(CH₂)₂Si(OCH₃)₂(OH)
CH₃(CF₂)₇(CH₂)₂Si(NCO)₂(OH)
CH₃(CF₂)₈(CH₂)₂Si(OCH₃)₂(OH)
CH₃(CF₂)₈(CH₂)₂Si(NCO)₂(OH)
CH₃(CF₂)₉(CH₂)₂Si(OCH₃)₂(OH)
CH₃(CF₂)₉(CH₂)₂Si(NCO)₂(OH)
CH₃CH₂(CF₂)₆(CH₂)₂Si(OCH₃)₂(OH)
CH₃CH₂(CF₂)₆(CH₂)₂Si(NCO)₂(OH)
CH₃CH₂(CF₂)₈(CH₂)₂Si(OCH₃)₂(OH)
CH₃CH₂(CF₂)₈(CH₂)₂Si(NCO)₂(OH)
CH₃CH₂(CF₂)₁₀(CH₂)₂Si(OCH₃)₂(OH)
CH₃(CF₂)₄O(CF₂)₂(CH₂)₂Si(OCH₃)₂(OH)
CH₃(CF₂)₇(CH₂)₂O(CH₂)₃Si(OCH₃)₂(OH)
CH₃(CF₂)₈(CH₂)₂O(CH₂)₃Si(OCH₃)₂(OH)
CH₃(CF₂)₉(CH₂)₂O(CH₂)₃Si(OCH₃)₂(OH)
CH₃CH₂(CF₂)₆(CH₂)₂O(CH₂)₃Si(OCH₃)₂(OH)
CH₃(CF₂)₆CONH(CH₂)₃Si(OCH₃)₂(OH)
CH₃(CF₂)₈CONH(CH₂)₃Si(OCH₃)₂(OH)
CH₃(CF₂)₃O[CF(CF₃)CF(CF₃)O]₂CF(CF₃)CONH(CH₂)₃Si(OCH₃)₂(OH)
CH₃CH₂O(CH₂)₁₅Si(OH)₃
CF₃CH₂O(CH₂)₁₅Si(OH)₃
CH₃(CH₂)₂Si(CH₃)₂(CH₂)₁₅Si(OH)₃
CH₃(CH₂)₆Si(CH₃)₂(CH₂)₉Si(OH)₃
CH₃COO(CH₂)L₅Si(OH)₃
CF₃(CF₂)₅(CH₂)₂Si(OH)₃
CF₃(CF₂)₇(CH=CH)₃Si(OH)₃
CH₃CH₂O(CH₂)₁₅Si(OH)₃
CH₃(CH₂)₂Si(CH₃)₂(CH₂)₁₅Si(OH)₃
CH₃(CH₂)₆Si(CH₃)₂(CH₂)₉Si(OH)₃
CF₃(CH₂)₆Si(CH₃)₂(CH₂)₉Si(OH)₃
CH₃COO(CH₂)₁₅Si(OH)₃
CF₃COO(CH₂)₁₅Si(OH)₃
CF₃(CF₂)₉(CH₂)₂Si(OH)₃
CF₃(CF₂)₇(CH₂)₂Si(OH)₃
CF₃(CF₂)₅(CH₂)₂Si(OH)₃
CF₃(CF₂)₇(CH=CH)Si(OH)₃
CF₃(CF₂)₉(CH₂)₂Si(OH)₃
CF₃(CF₂)₅(CH₂)₂Si(OH)₃
CF₃(CF₂)₇(CH₂)₂Si(CH₃)₂(OH)
CF₃(CH₂)₂Si(OH)₃
CF₃(CF₂)₃(CH₂)₂Si(OH)₃
CF₃(CF₂)₅(CH₂)₂Si(OH)₃
CF₃(CF₂)₇(CH₂)₂Si(OH)₃
CF₃(CF₂)₃(CH₂)₃Si(OH)₃
CF₃(CF₂)₅(CH₂)₃Si(OH)₃
CF₃(CF₂)₇(CH₂)₃Si(OH)₃
CF₃(CF₂)₄O(CF₂)₂(CH₂)₂Si(OH)₃
CF₃(CF₂)₄O(CF₂)₂(CH₂)₃Si(OH)₃
CF₃(CF₂)₇(CH₂)₂O(CH₂)₃Si(OH)₃
CF₃(CF₂)₇CONH(CH₂)₂Si(OH)₃
CF₃(CF₂)₇CONH(CH₂)₃Si(OH)₃
CF₃(CF₂)₃O[CF(CF₃) CF(CF₃)O]₂CF(CF₃)CONH(CH₂)₃Si(OH)₃
CH₃(CH₂)₇Si(OH)₃
CH₃(CF₂)₇(CH₂)₂Si(OH)₃
CH₃(CF₂)₇(CH₂)₂Si(OH)₃
CH₃(CF₂)₈(CH₂)₂Si(OH)₃
CH₃(CF₂)₉(CH₂)₂Si(OH)₃
CH₃CH₂(CF₂)₆(CH₂)₂Si(OH)₃
CH₃CH₂(CF₂)₈(CH₂)₂Si(OH)₃
CH₃CH₂(CF₂)₁₀(CH₂)₂Si(OH)₃
CH₃(CF₂)₄O(CF₂)₂(CH₂)₂Si(OH)₃
CH₃(CF₂)₇(CH₂)₂O(CH₂)₃Si(OH)₃
CH₃(CF₂)₈(CH₂)₂O(CH₂)₃Si(OH)₃
CH₃(CF₂)₉(CH₂)₂O(CH₂)₃Si(OH)₃
CH₃CH₂(CF₂)₆(CH₂)₂O(CH₂)₃Si(OH)₃
CH₃(CF₂)₆CONH(CH₂)₃Si(OH)₃
CH₃(CF₂)₈CONH(CH₂)₃Si(OH)₃
CH₃(CF₂)₃O[CF(CF₃)CF(CF₃)O]₂CF(CF₃)CONH(CH₂)₃Si(OH)₃
CF₃(CF₂)₃(CH₂)₂Si(CH₃)(OH)₂
CF₃(CF₂)₅(CH₂)₂Si(CH₃)(OH)₂
CF₃(CH₂)₂Si(CH₃)(OH)₂
CF₃(CF₂)₃(CH₂)₃Si(CH₃)(OH)₂
CF₃(CF₂)₅(CH₂)₃Si(CH₃)(OH)₂
CF₃(CF₂)₇(CH₂)₃Si(CH₃)(OH)₂
CF₃(CF₂)₄(CF₂)₂(CH₂)₂Si(CH₃)(OH)₂
CF₃(CF₂)₄(CF₂)₂(CH₂)₃Si(CH₃)(OH)₂
CF₃(CF₂)₄(CH₂)₂O(CH₂)₃Si(CH₃)(OH)₂
CF₃(CF₂)₇CONH(CH₂)₂Si(CH₃)(OH)₂
CF₃(CF₂)₇CONH(CH₂)₃Si(CH₃)(OH)₂
CF₃(CF₂)₃O[CF(CF₃)CF(CF₃)O]₂CF(CF₃)CONH(CH₂)₃Si(CH₃)(OH)₂
CH₃(CF₂)₇(CH₂)₂Si(CH₃)(OH)₂

These compounds may be used alone, or by combining 2 or more of them.

(II) Catalyst that can Interact with the Metal Surfactant

As for a catalyst that can interact with the metal surfactant, and that is contained in the organic solvent solution of the step (B) of the present invention, it is not particularly limited as long as it is a catalyst having an action of activating a hydrolysable group or hydroxyl group, and promoting condensation, by interacting with a metal moiety or a hydrolysable group moiety of the metal surfactant, etc. via a coordinate bond or hydrogen bond, etc. Among these, at least one compound selected from the group consisting of metal oxide; metal hydroxide; metal alkoxides, chelated or coordinated metal compound; partial hydrolyzed product of metal alkoxides; hydrolysed products obtained by treating metal alkoxides with water in an amount equivalent to 2-fold or more of the metal alkoxides; organic acid; silanol condensation catalyst and acid catalyst is preferred. Further, metal alkoxides, and partial hydrolyzed product of metal alkoxides are more preferred.

There is no specific limitation for a metal of metal oxide; metal hydroxide; metal alkoxides, chelated or coordinated metal compounds; partial hydrolyzed product of metal alkoxides; hydrolysed product obtained by treating metal alkoxides with water in an amount equivalent to 2-fold or more of the metal alkoxides; and silanol condensation catalyst, while it is preferred to be at least one metal selected from the group consisting of titanium, zirconium, aluminum, silicon, germanium, indium, tin, tantalum, zinc, tungsten, and lead, and it is more preferred to be titanium, zirconium, aluminum, or silicon, and silicon is particularly preferred.

(Metal Oxides)

Metal oxides may be used in any state of sol, gel, or solid state. The production method of gel and sol is not particularly limited. For example, in case of silica sol, a method of conducting cation exchange to sodium silicate solution, and a method of hydrolyzing silicon alkoxide can be exemplified. Particularly, a sol dispersed stably in an organic solvent is preferred, and it is preferred that the sol particle diameter is 10 to 100 nm, and more preferably 10 to 20 nm. The sol shape is not particularly limited, and a sol in shape of sphere, or having an elongated shape may be used.

Specifically, methanol silica sol, IPA-ST, IPA-ST-UP, IPA-ST-ZL, NPC-ST-30, DMAC-ST, MEK-ST, MIBK-ST, XBA-ST, PMA-ST (all are product names of organo-silica sol, from Nissan Chemical Industries, Ltd.) may be exemplified.

The amount of metal oxides used is not particularly limited as long as it is an amount that does not affect the formed chemisorbed film. Particularly, it is preferred to use a catalyst amount relative to the metal surfactant. Furthermore, it is preferred to use in an amount of 0.001 to 1 mol, more preferably 0.001 to 0.2 mol in mol in terms of oxides per 1 mol of metal surfactant. These metal oxides may be used alone, or by combining 2 or more of them.

(Metal Hydroxides)

As for a metal hydroxide, it may be obtained by any production method, as long as it is a hydroxide of a metal. A method for producing metal hydroxide may be exemplified by a method of hydrolyzing metal alkoxides, or a method comprising allowing metal salt to react with metal hydroxide, etc. described in the following. Further, a commercially offered metal hydroxide may be used after purifying it according to need.

(Metal Alkoxides)

The carbon number in the alkoxy group of metal alkoxides is not particularly limited, while a carbon number of 1 to 4 is preferred from the view points of concentration of the contained-oxide, easiness of eliminating organic matters, and easiness to obtain. Specific examples of metal alkoxides used in the present invention include: silicon alkoxides such as $Si(OCH_3)_4$, $Si(OC_2H_5)_4$, $Si(OC_3H_7\text{-}i)_4$, $Si(OC_4H_9\text{-}t)_4$; titanium alkoxides such as $Ti(OCH_3)_4$, $Ti(OC_2H_5)_4$, $Ti(OC_3H_7\text{-}i)_4$, $Ti(OC_4H_9)_4$; tetrakistrialkyl siloxytitanium such as $Ti[OSi(CH_3)_3]_4$, $Ti[OSi(C_2H_5)_3]_4$; zirconium alkoxides such as $Zr(OCH_3)_4$, $Zr(OC_2H_5)_4$, $Zr(OC_3H_7)_4$, $Zr(OC_4H_9)_4$; aluminum alkoxides such as $Al(OCH_3)_4$, $Al(OC_2H_5)_4$, $Al(OC_3H_7\text{-}i)_4$, $Al(OC_4H_9)_4$; germanium alkoxides such as $Ge(OC_2H_5)_4$; indium alkoxides such as $In(OCH_3)_3$, $In(OC_2H_5)_3$, $In(OC_3H_7\text{-}i)_3$, $In(OC_4H_9)_3$; tin alkoxides such as $Sn(OCH_3)_4$, $Sn(OC_2H_5)_4$, $Sn(OC_3H_7\text{-}i)_4$, $Sn(OC_4H_9)_4$; tantalum alkoxides such as $Ta(OCH_3)_5$, $Ta(OC_2H_5)_5$, $Ta(OC_3H_7\text{-}i)_5$, $Ta(OC_4H_9)_5$; tungsten alkoxides such as $W(OCH_3)_6$, $W(OC_2H_5)_6$, $W(OC_3H_7\text{-}i)_6$, $W(OC_4H_9)_6$; zinc alkoxides such as $Pb(OC_4H_9)_6$; lead alkoxides such as $Zn(OC_2H_5)_2$. These metal alkoxides may be used alone or by combining 2 or more of them.

Further, in the present invention, a complex alkoxide obtained by a reaction of 2 or more metal alkoxides; a complex alkoxide obtained by a reaction of 1 or more metal alkoxides with 1 or more metal salts; or a combination thereof may be used as metal alkoxides.

As a complex alkoxide obtained by a reaction of 2 or more metal alkoxides, a complex alkoxide obtained from a reaction of an alkoxide of alkaline metal or alkaline earth metal with an alkoxide of transition metal; and a complex alkoxide obtained in a form of complex salt by a combination of 3B elements can be exemplified.

Specific examples include $BaTi(OR)_6$, $SrTi(OR)_6$, $BaZr(OR)_6$, $SrZr(OR)_6$, $LiNb(OR)_6$, $LiTa(OR)_6$, or a combination thereof; reaction products of silicon alkoxides such as $LiVO(OR)_4$, $MgAl_2(OR)_8$, $(RO)_3SiOAl(OR')_2$, $(RO)_3SiOTi(OR')_3$, $(RO)_3SiOZr(OR')_3$, $(RO)_3SiOB(OR')_2$, $(RO)_3SiONb(OR')_4$, $(RO)_3SiOTa(OR')_4$, and the above metal alkoxides, and condensates thereof. Herein, R and R' represent an alkyl group, etc.

As a complex alkoxide obtained by a reaction of 1 or 2 or more metal alkoxides with 1 or 2 or more metal salts, a compound obtained by a reaction of metal salt and metal alkoxides can be exemplified.

As metal salts, chloride, nitrate, sulfate, acetate, formate, and oxalate can be exemplified. As metal alkoxides, the same as the above metal alkoxides can be exemplified.

The amount of metal alkoxides used is not particularly limited as long as it is an amount that does not affect the formed chemisorbed film. Particularly, it is preferred to use a catalyst amount relative to the metal surfactant. Furthermore, it is preferred to use in an amount of 0.001 to 1 mol, more preferably 0.01 to 0.2 mol per 1 mol of metal surfactant; or 0.001 to 1 mol, more preferably 0.001 to 0.2 mol in mol in terms of oxides. These metal alkoxides may be used alone, or by combining 2 or more of them.

(Partial Hydrolyzed Product of Metal Alkoxides)

Partial hydrolyzed product of metal alkoxides are products obtained before hydrolyzing completely metal alkoxides, and can be exemplified by precursor of metal oxide sol, or those present as an oligomer.

Specifically, a dispersed material having a property of being dispersed stably without being agglutinated in the absence of acid, base and/or dispersion stabilizer in an organic solvent can be preferably exemplified. Herein, a dispersed material relates to a microparticle dispersed in the dispersion system, and colloid particles can be specifically exemplified. Herein, a state being stably dispersed without being agglutinated relates to a state wherein a dispersed material of a hydrolyzed product is not separated nonhomogeneously by being aggregated in an organic solvent, in the absence of acid, base, and/or dispersion stabilizer, and preferably to a state of being transparent and uniform. Transparent relates to a state wherein the transmission in the light is high, and specifically it is related to a state wherein the spectral transmittance is preferably 80 to 100%, under the conditions where the concentration of a dispersed material is 0.5 wt % in terms of oxides, the light path length of quartz cell is 1 cm, and an organic solvent is used as a control sample, and the wave length of light is 550 nm. The particle diameter of a dispersed material of the hydrolyzed product is not particularly limited, however it is usually 1 to 100 nm, preferably 1 to 50 nm, and more preferably 1 to 10 nm, in order to obtain a high transmittance in the visible light. It will be described in the following for acid, base, and dispersion stabilizer.

The method for producing partial hydrolyzed products of metal alkoxides can be preferably exemplified by a method of hydrolyzing by using water within a mol range of 0.5 to 2.0-fold relative to the above exemplified metal alkoxides, at a temperature of $-100°$ C. to the reflux temperature of the organic solvent in an organic solvent, in the absence of acid, base, and/or dispersion stabilizer.

Specific examples include:

(1) a method of adding water in an amount of 0.5 to 1.0-fold mol relative to metal alkoxides in an organic solvent, in the absence of acid, base, and/or dispersion stabilizer;

(2) a method of adding water in an amount of 1.0 to 2.0-fold relative to metal alkoxides, at a temperature below the temperature at which hydrolysis starts, or below 0° C., preferably −50° C. to −100° C., in an organic solvent, in the absence of acid, base, and/or dispersion stabilizer;

(3) a method of adding water in an amount of 0.5 to 2.0-fold mol relative to metal alkoxides at room temperature, by controlling hydrolysis rate by a method of controlling the addition rate of water, or diluting the concentration of water to be added by using a soluble solvent, etc., in an organic solvent, in the absence of acid, base, and/or dispersion stabilizer.

(1) In the above method (1), reaction can be conducted by treating with a certain amount of water at an arbitrary temperature, and then adding further water under a temperature condition of a temperature below the temperature at which hydrolysis starts, or below 20° C.

A reaction of metal alkoxides and water can be performed by mixing directly metal alkoxides and water without using an organic solvent, but it is preferred to conduct the reaction in an organic solvent. Specifically, it can be conducted by either of a method of adding water diluted with an organic solvent to an organic solvent solution of metal alkoxides; a method of adding metal alkoxides or an organic solvent solution thereof to an organic solvent wherein water is suspended or dissolved. However, the former method of adding water afterwards is preferred.

The water used is not particularly limited as long as it is neutral, while it is preferred to use pure water or distilled water. The amount thereof is not particularly limited as long as it is within the range determined in the above, and may be selected arbitrarily according to a dispersed material having the intended property.

The concentration of metal alkoxides in an organic solvent is not particularly limited as long as it is within a range that suppresses rapid heat generation, and that has a fluidity that allows stirring. Usually, it is within to 30 wt %.

The reaction temperature of metal alkoxides and water in the above method (1) is not particularly limited, and it is usually within −100° C. to +100° C., and preferably within −20° C. to the boiling point of the organic solvent used, or of the alcohol detached by hydrolysis.

The temperature at which water is added in the above method (2) is not particularly limited as long as it depends on the stability of metal alkoxides, and is below the temperature at which hydrolysis starts, or a temperature of below 0° C. However, it is preferred to add water to metal alkoxides at within a temperature range of −50° C. to −100° C., according to the types of metal alkoxides. Further, it is possible to add water at a low temperature, allow maturing for a certain time, hydrolyzing at room temperature to reflux temperature of the solvent used, and then performing dehydration-condensation reaction.

The reaction of metal alkoxides and water in the above method (3) can be performed within a temperature range that is possible to cool down without using a particular cooling device, for example, from 0° C. to room temperature, by controlling the hydrolysis rate by a method other temperature, for example by controlling the water adding rate. It is possible to allow maturing for a certain time, hydrolyzing at room temperature to reflux temperature of the solvent used, and then performing dehydration-condensation reaction.

As an organic solvent, it is preferred that the hydrolyzed products of metal alkoxides may be dispersed as a dispersed material in the organic solvent, and a solvent which solubility to water is high and does not clot at a low temperature is more preferred, because the reaction of treating metal surfactant with water may be conducted at a low temperature.

Specific examples of organic solvent used include: alcoholic solvent such as methanol, ethanol, and isopropanol; halogenated hydrocarbonic solvent such as methylene chloride, chloroform, chlorobenzen; hydrocarbonic solvent such as hexane, cyclohexane, benzene, toluene, and xylene; ether solvent such as tetrahydrofuran, diethylether, and dioxane; ketone solvent such as acetone, methylethyl ketone, and methyl isobutyl ketone; amido solvent such as dimethylformamide N-methylpyrrolidone; sulfoxide solvent such as dimethylsulfoxide; silicone such as methylpolysiloxane, octamethylcyclotetrasiloxane, decamethylcyclopentanesiloxane, and methylphenylpolysiloxane (Japanese Laid-Open Patent Application No. 9-208438).

These solvents may be used alone or by combining 2 or more of them.

When used as a mixed solvent, a combination of hydrocarbonic solvent such as toluene and xylene, and a lower alcohol solvent such as methanol, ethanol, isopropanol, and t-butanol is preferred. Herein, as a lower alcohol solvent, it is preferred to use an alcohol solvent of secondary alcohol or superior, such as isopropanol and t-butanol. The mixing ratio of the mixed solvent is not particularly limited, but it is preferred to use hydrocarbonic solvent and lower alcohol solvent within 99/1 to 50/50 as volume ratio.

In a hydrolysis reaction of metal alkoxides with water, acid, base or dispersion stabilizer may be added. The acid or base is not particularly limited as long as it can function as a deflocculant that disperse again the precipitation formed by condensation; as a catalyst for producing a dispersed material such as colloid particles by performing hydrolysis and dehydration-condensation on metal alkoxides, and as a dispersion agent for the generated dispersed material.

Herein, the acid or base is not particularly limited, as long as it can function as a defflocculant that disperse again the precipitation formed by condensation; as a catalyst for producing a dispersed material such as colloid particles by performing hydrolysis and dehydration-condensation on metal alkoxides, and as a dispersion agent for the generated dispersed material.

Examples of the acid used include: mineral acid such as hydrochloric acid, nitric acid, boric acid, and fluoroboric acid; organic acids such as acetic acid, formic acid, oxalic acid, carbonic acid, trifluoroacetic acid, p-toluene sulfonic acid, and methanesulfonic acid; photoacid-generating agent which generates acid by photoirridation of diphenyliodonium hexafluorophosphate, triphenylphosphonium hexafluorophosphate, etc.

Examples of bases used include: triethanol amine, triethyl amine, 1,8-diazabicyclo [5.4.0]-7-undecene, ammonia, dimethylformamide, and phosphine.

A dispersion stabilizer is an agent having an effect of dispersing a dispersed agent stably in the dispersion system, and include agents for preventing condensation such as defloculant, protective colloid, and surfactant. Specific examples include a multilocus ligand compound having a strong chelating ability to multivalent carboxylic acid such as glycolic acid, gluconic acid, lactic acid, tartaric acid, citric acid, malic acid, and succinic acid; hydroxycarboxylic acid; phosphoric acid such as pyrophosphoric acid and tripolyphosphoric acid; metal atoms such as acetylacetone, methyl acetoacetate, ethyl acetoacetate, n-propyl acetoacetate, isopropyl acetoacetate, n-butyl acetoacetate, sec-butyl acetoacetate, t-butyl acetoacetate, 2,4-hexane-dione, 2,4-heptane-dione, 3-5 heptane-dione, 2,4-octane-dione, 2,4-nonane-dione, 5-methyl-hexane dione; aliphatic amines such as SULPERCE 3000, 9000, 17000, 20000, 24000 (Zeneca), Disperbyk-161, -162, -163, -164 (BYK), hydroxystearic acid, polyester amine; silicone compounds such as dimethylpolysiloxane-methyl (polysiloxy alkylene) siloxane copolymer, trimethylsiloxy silicic acid, carboxy denatured silicone oil, amine denatured silicon, etc. (Japanese Laid-Open Patent Application No. 9-208438; Japanese Laid-Open Patent Application No. 2000-53421).

The amount of the partial hydrolyzed product of metal alkoxides used, is not particularly limited as long as it is an amount that does not affect the formed organic thin film. Particularly, it is preferred to use a catalyst amount relative to the metal surfactant. Furthermore, it is preferred to use in an amount of 0.001 to 1 mol, more preferably 0.001 to 0.2 mol, in mol in terms of oxides per 1 mol of metal surfactant. These partial hydrolyzed product of metal alkoxides may be used alone, or by combining 2 or more of them.

(Hydrolyzed Products of Metal Alkoxides)

Hydrolyzed products of metal alkoxides are products obtained by hydrolyzing the metal alkoxides with water in an amount equivalent to 2-fold or more of the metal alkoxides.

The hydrolyzed products may be a product obtained by hydrolyzing metal alkoxides with water in an amount equivalent to 2-fold or more of the metal alkoxides, or it may be a product obtained by partially hydrolyzing with water in an amount of less than 2-fold of metal alkoxides to obtain a partial hydrolyzed product of metal alkoxides, and then further hydrolyzing the partial hydrolyzed product with a certain amount of water (water in an amount so that the total amount of water is equivalent to 2-fold or more of the amount of metal alkoxides together with the amount of water used in the former partial hydrolysis).

Reaction of metal alkoxides with water may be conducted without using an organic solvent, by mixing directly metal alkoxides with water, while in the present invention, it is preferred to react metal alkoxides and water in an organic solvent.

The water used is not particularly limited as long as it is neutral, while it is preferred to use pure water, distilled water, or ion exchange water from the view points of obtaining dense organic thin film with less impurity.

The amount of water used is an amount equivalent to 2-fold or more of the metal alkoxides, preferably equivalent to 2.0 to 8-fold, and more preferably equivalent to 3 to 5-fold of the metal alkoxides.

As a method for allowing to react metal alkoxides and water in an organic solvent, the following can be exemplified:
(1) a method of adding water or water diluted with an organic solvent in an organic solvent solution of metal alkoxides;
(2) a method of adding metal alkoxides, or an organic solvent solution of metal alkoxides in an organic solvent wherein water is suspended or dissolved. Herein, the concentration of metal alkoxides in the organic solvent is not particularly limited as long as it is within a range that suppresses rapid heat generation, and that has a fluidity that allows stirring. It is preferred to be within 5 to 30 wt %.

As an organic solvent used, it is preferred that the hydrolyzed products of metal alkoxides may be dispersed as a dispersed material in the organic solvent, and specific preferred examples include similar organic solvents to those for the above-mentioned partial hydrolyzed products of metal alkoxides.

Further, as for the hydrolyzed products, the same water, acid, base or dispersion stabilizer beside organic solvent as those used for the partial hydrolyzed products may be used, and are not particularly limited.

The hydrolysis reaction temperature for metal alkoxides depends on the reactivity or stability of the metal alkoxides used, while it is usually between −100° C. and the reflux temperature of the organic solvent, preferably between −100° C. and −20° C. It is also possible to add water at a low temperature, allow maturing for a certain time, and increase the temperature of the reaction solution from room temperature to reflux temperature of the solvent used, and then to perform hydrolysis and dehydration-condensation reaction.

(Chelated or coordinated metal compounds)

Chelated or coordinated metal compounds may be prepared by adding a chelating agent or coordination compound that can form a complex with the metal of the metal compound, in the metal compound solution. Chelating agents or coordination compounds are not particularly limited as long as it can form a complex by being chelated or coordinated to a metal hydroxide, metal alkoxides or metal of a hydrolyzed product obtained by treating metal alkoxides with water.

Specific examples of chelating agents or coordination compounds include; saturated aliphatic carboxylic acids such as acetic acid, propionic acid, butyric acid, valeric acid, lauric acid, myristic acid, palmitic acid, and stearic acid; saturated aliphatic dicarboxylic acids such as oxalic acid, malonic acid, succinic acid, glutaric acid, adipic acid, pimilic acid, suberic acid, azelaic acid, and sebacic acid; unsaturated carboxylic acids such as acrylic acid, methacrylic acid, crotonic acid, oleic acid, and maleic acid; aromatic carboxylic acids such as benzoic acid, toluic acid, and phtalic acid; halogenocarboxylic acids such as chloroacetic acid, trifluoroacetic acid; β-diketones such as acetyl acetone, benzoyl acetone, hexafuloroacetyl acetone; β-ketoesters such as methyl acetoacetate and ethyl acetoacetate; heterocyclic compounds such as tetrahydrofuran, furan, furan carboxylic acid, thiophene, thiophene carboxylic acid, pyridine, nicotinic acid, and isonicotinic acid. These may be used alone or by combining 2 or more of them.

The additive amount of chelating agent or coordination compound is 0.1 to 10-fold mol, preferably 0.3 to 2-fold mol, and more preferably 0.5 to 1.2-fold mol relative to 1 mol of metal hydroxide, metal alkoxides, or metal of a hydrolyzed product obtained by treating metal alkoxides with water.

A solution of metal complex can be obtained by stirring sufficiently the total resultant after adding a chelating agent or coordination compound. The stirring temperature is usually within a temperature range of 0° C. to the boiling point of the solvent used. The stirring time is usually from several minutes to several hours. The chelated or coordinated metal compound can be used as a separated compound, or as a solution of the chelated or coordinated metal compound obtained by adding a chelating agent or coordination compound to the solution of the metal compound. The prepared solution of chelated or coordinated metal compound can be stored.

(Silanol Catalysts)

Examples of silanol condensation catalysts include: metal carboxylate, metal carboxylate ester, metal carboxylate polymer, metal chelate carboxylate, titanate ester, and titanate ester chelate. Specifically, stannous acetate, dibutyl tin dilaurate, dibutyl tin dioctate, dibutyl tin diacetate, dioctyl tin dilaurate, dioctyl tin dioctate, dioctyl tin diacetate, stannous dioctanoate, lead naphtenate, cobalt naphthenate, iron 2-ethylhexanoate, dioctyl tin bis octylthioglycolate ester, dioctyl tin maleate ester, dibutyl tin maleate polymer, dimethyl tin mercaptopropionate polymer, dibutyl tin bis acetyl acetate, dioctyl tin bis acetyl laurate, titanium tetraetoxide, titanium tetrabutoxide, titanium tetraisopropoxide, and titanium tis (acetyl acetonyl) dipropoxide.

(Organic Acids)

Examples of organic acids used in the present invention include: saturated aliphatic monocarboxylic acid such as formic acid, acetic acid, propionic acid, butyric acid, isobutyric acid, valeric acid, isovaleric acid, pivalic acid, hexane acid, octane acid, decane acid, lauric acid, myristic acid, palmitic acid, and stearic acid; saturated aliphatic dicarboxylic acid such as oxalic acid, malonic acid, succinic acid, glutaric acid, and adipic acid; unsaturated aliphatic monocarboxylic acid such as acrylic acid, propiolic acid, metacrylic acid, crotonic acid, isocrotonic acid, and oleic acid; unsaturated aliphatic dicarboxylic acid such as fumaric acid, and maleic acid; aromatic carboxylic acid such as benzoic acid, 4-chlorobenzoic acid, and naphthalene carboxylic acid; aliphatic carboxylic acid substituted with a halogen atom such as monochloroacetic acid, and trifluoroacetic acid; hydroxycarboxylic acid such as glycolic acid, lactic acid, malic acid, and citric acid; aliphatic carboxylic acid substituted with an aromatic group such as phenylacetic acid, and 3-phenylpropionic acid; and sulfonic acid such as benzene sulfonic acid, p-toluene sulfonic acid, and methane sulfonic acid.

Among these organic acids, organic acids which Pka value (logarithm value of inverse number of acid dissociation constant) is 1 to 6 are preferred, and those which Pka value is 2 to 5 are more preferred, as the ability to activate a hydrolysable group of metal surfactant is excellent and it is easy to handle.

The acid dissociation constant Ka can be measured accurately by a potentiometry using various electrodes, such as glass electrode, metal electrode, metal amalgam electrode, redox electrode, and ion-selective electrode. In the present invention, the acid dissociation constant Ka can be obtained by measuring the pH level of water solution (for those not dissolving in water, pH of a mixed solvent of water and a suitable organic solvent, or of an appropriate organic solvent). pKa level may vary about ±0.3 according to the measuring conditions. The acid dissociation constants Ka or Pka levels of various organic acids are described in A. E. Martell, R. M. Smith, Critical Stability Constants, Vol. 1, 2, 3, 5, Plenum Press (1974, 1975, 1977, 1982), etc.

(Acid Catalysts)

Examples of acid catalysts include mineral acids such as hydrochloric acid, nitric acid, boric acid, and fluoroboric acid; organic acids such as acetic acid, formic acid, oxalic acid, carbonic acid, trifluoroacetic acid, p-toluene sulfonic acid, and methane sulfonic acid, and further include photo-acid-generating agent which generates acid by photoirridation, which specific examples include diphenyliodonium hexafluorophosphate and triphenylphosphonium hexafluorophosphate.

(III) Organic Solvents Used in an Organic Solvent Solution

As for organic solvents used in an organic solvent solution used in the present invention, hydrocarbonic solvent, fluorocarbonic solvent, and silicone solvent are preferred, where hydrocarbonic solvent is more preferred. Among these, those which boiling point is 100° C. to 250° C. are particularly preferred.

Specifically, hydrocarbonic solvents such as n-hexane, cyclohexane, benzene, toluene, xylene, petroleum naphtha, solvent naphtha, petroleum ether, petroleum benzin, isoparaffin, normal paraffin, decalin, industrial gasoline, kerosene, and ligroin; fluorocarbonic solvents such as fluorocarbon solvent such as $CBr_2ClCF_3$, $CClF_2CF_2CCl_3$, $CClF_2CF_2CHFC_1$, $CF_3CF_2CHCl_2$, $CF_3CBrFCBrF_2$, $CClF_2CClFCF_2CCl_3$, $Cl(CF_2CFCl)_2Cl$, $Cl (CF_2CFCl)_2CF_2CCl_3$, $Cl (CF_2CFCl)_3$ Cl, Fluorinert (3M), Afulude (Asahi Glass CO., Ltd.); and silicone solvents such as dimethyl silicone, phenyl silicone, alkyl-modified silicone, and polyether silicone can be exemplified. These solvents may be used alone or by combining 2 or more of them.

(IV) Content

The content of metal surfactant in the organic solvent solution used in the present invention is not particularly limited, while a range from 0.1 to 30 wt % is preferred to produce a dense monomolecular film.

Further, the amount used of catalysts that can interact with a metal surfactant is not particularly limited as long as it is an amount that does not affect the properties of the monomolecular organic thin film to be formed, while it is usually within 0.001 to 1 mol, preferably 0.001 to 0.2 mol in mols in terms of oxides per 1 mol of metal surfactant.

(V) Method for Producing an Organic Thin Film

The method for producing an organic thin film of the present invention is a method for producing an organic thin film for forming an organic thin film on a substrate surface comprising at least a step (B) of allowing the substrate to contact with an organic solvent solution comprising a metal surfactant having at least one or more hydrolysable group or hydroxyl group, and a catalyst that can interact with the metal surfactant, wherein the method further comprises the following step (E1), (E2), or (E3) after the step (B):

a step (E1) of heating the substrate which has been in contact with the organic solvent solution at 100° C. to 150° C.;

a step (E2) of immersing the substrate which has been in contact with the organic solvent solution in a warm water of 40° C. or more and below the boiling point;

a step (E3) of allowing the substrate which has been in contact with the organic solvent solution to contact with a moisture vapor of 60° C. to 150° C. By adding the step (E1), (E2), or (E3) after the step (B), an organic thin film which film properties such as heat resistance or durability are improved can be obtained. By adding the step (E1), (E2) or (E3), the hydrolysis and binding ratio of the hydrolysable group or hydroxyl group of the metal surfactant used in the present invention between adjacent molecules increase, and thus the film properties of the organic thin film such as heat resistance or durability are improved.

The step (E1) is a step of heating the substrate which has been in contact with the organic solvent solution of the present invention at 100° C. to 150° C., preferably at 100° C. to 130° C., and more preferably at 100° C. to 120° C. Other conditions such as heating time are not limited as long as it is heated within these temperature ranges, and it can be heated for example, for 1 to 60 min, preferably for 10 to 20 min.

In step (E1), the relative humidity of the gas of a certain temperature to be in contact with the substrate which has been contacted with the organic solvent solution of the present invention is not particularly limited.

However, it is preferred that the relative humidity of the gas to be in contact with the surface of the substrate which has been in contact with the organic solvent solution of the present invention is 60% RH or less, more preferably 40% RH or less, and still more preferably 20% RH or less.

The step (E2) is a step of immersing the substrate which has been in contact with the organic solvent solution of the present invention in a warm water of 40° C. or more and below the boiling point, preferably in a warm water of 50° C. or more and below the boiling point, and more preferably in a warm water of 60° C. or more and below the boiling point. Other conditions such as immersing time are not limited as long as it is immersed in a warm water of within these temperature ranges, and it can be immersed for example for 5 min to 5 hours, preferably for 10 min to 3 hours, and more preferably from 10 min to 1 hour.

It is preferred that the method further comprises a step (F2) of heating the substrate which has been immersed in a warm water at 80° C. to 150° C., preferably at 100° C. to 130° C., and more preferably at 100° C. to 120° C., after the step (E2). By adding such step (F2) after the step (E2), an organic thin film which film properties such as heat resistance or durability are further improved can be obtained.

In step (F2), other conditions such as heating time are not limited as long as the substrate that has been immersed in a warm water is heated within these temperature ranges, and it can be heated for example, for 1 to 60 min, preferably for 10 to 20 min.

In step (F2), the relative humidity of the gas of a certain temperature to be in contact with the surface of the substrate immersed in warm water is not particularly limited. However, it is preferred that the relative humidity of the gas to be in contact with the surface of the substrate immersed in warm water is 60% RH or less, more preferably 40% RH or less, and most preferably 20% RH or less.

The step (E3) is a step of allowing the substrate which has been in contact with the organic solvent solution of the present solution to contact with a moisture vapor of 60° C. to 150° C., preferably of 80° C. to 130° C., and more preferably of 80° C. to 100° C. Other conditions including the contact time with moisture vapor are not particularly limited as long as the substrate which has been in contact with the organic solvent solution is in contact with moisture vapor of these temperature ranges, and it can be in contact with the moisture vapor for 1 to 60 min, preferably for 10 to 20 min.

In step (E3), allowing the substrate which has been in contact with the organic solvent solution of the present invention to contact with a moisture vapor is not particularly limited as long as the organic solvent solution of the substrate surface is in contact with a moisture vapor of a certain temperature. For example, it is possible to allow the substrate to contact with moisture vapor by spraying directly the moisture vapor of a certain temperature to the substrate which has been in contact with the organic solvent solution of the present invention, or it is possible to allow the substrate which has been in contact with the organic solvent solution of the present invention to coexist with the moisture vapor of a certain temperature range in a space of a certain temperature range (for example 60° C. to 150° C.). As a method for allowing the substrate which has been in contact with the organic solvent solution of the present solution to coexist with a moisture vapor of a certain temperature range in a space of a certain temperature range (for example 60° C. to 150° C.), specific examples include a method of allowing the substrate which has been in contact with the organic solvent solution of the present invention to coexist with a container filled with water (container wherein at least a part of water in the container can be in contact with the gas in the space) in a space of a certain temperature range.

The amount of moisture vapor to be in contact with the substrate which has been in contact with the organic solvent solution of the present invention is not particularly limited as long as an organic thin film which film properties such as heat resistance or durability are improved can be obtained, while it is preferred that the relative humidity on the surface of the substrate which has been in contact with the organic solvent solution of the present invention is 60% RH or more, more preferably 80% RH or more, and most preferably 90% RH or more.

Among the steps (E1), (E2), and (E3) in the method for producing an organic thin film of the present invention, it is most preferred that the method comprises the step (E3).

Further, the method for producing an organic thin film of the present invention should comprise any one of the steps (E1), (E2) and (E3), while it can comprise 1 or 2 or more of the steps selected from (E1), (E2) and (E3).

It is preferred that the method for producing an organic thin film of the present invention further comprises a step (A) of treating the substrate with UV ozone prior to the step (B). By adding such step (A), organic contamination on the substrate surface can be removed, and an organic thin film which film properties such as heat resistance or durability are improved can be obtained. UV ozone treatment in step (A) is not particularly limited as long as UV light is irradiated to the substrate in an ozone gas atmosphere, and a known UV ozone treatment method can be used.

It is preferred that the method for producing an organic thin film of the present invention further comprises a step (C) of washing the substrate with a hydrocarbonic organic solvent, after step (B) and prior to the step (E1), (E2) or (E3). By adding such step (C), the extra organic solvent solution of the present invention or impurities remaining on the substrate surface can be removed, and an organic thin film which film properties such as heat resistance or durability are improved can be obtained. Further, by providing such step (C), the film thickness can be controlled.

The hydrocarbonic organic solvent in step (C) is not particularly limited, and can be preferably exemplified by paraffins, aromatic hydrocarbons, and alicyclic hydrocarbons. Further, in such hydrocarbonic solvents, those with 4 to 12 carbon atoms (6 to 12 carbon atoms for aromatic hydrocarbons) are preferred, and those with 5 to 10 carbon atoms (6 to 10 carbon atoms for aromatic hydrocarbons) are more preferred. Specific examples include: pentane, hexane, heptane, octane, isooctane, benzene, toluene, xylene, cyclohexane, ligroin, petroleum ether, 1,2-diethylbenzene, 1,3-diethylbenzene, 1,4-diethylbenzene, 1,2-dimethyl-4-ethylbenzene, 1,3-dimethyl-5-ethylbenzene, 1,4-dimethyl-2-ethylbenzene, 1,2, 3,5-tetramethylbenzene, 1,2-dipropylbenzene, 1,2-dibutylbenzene, 1,2-dihexylbenzen, 1,2-didecylbenzene, 1,2-dioctadecylbenzene, and Sorbesso (registered trademark). These hydrocarbonic solvents may be used alone, or by combining 2 or more of them.

The method for washing the substrate with a hydrocarbonic organic solvent is not particularly limited as long as it is a method that can remove attachments on the surface of the substrate which has been in contact with the organic solvent solution of the present invention. Specific examples include a method of immersing the substrate which has been in contact with the organic solvent solution of the present invention in a hydrocarbonic organic solvent.

When the method for producing an organic thin film of the present invention comprises the step (C), it is preferred to further comprise a step (D) to remove the hydrocarbonic organic solvent attached to the substrate, between the step (C) and the step (E1), (E2), or (E3). By adding such step (D), the extra hydrocarbonic organic solvent remaining on the substrate surface is removed and an organic thin film which film properties such as heat resistance or durability are improved can be obtained.

The method for removing the hydrocarbonic organic solvent attached to the substrate is not particularly limited as long as the hydrocarbonic organic solvent attached to the substrate can be removed, and preferred examples include a method of spraying air directly on the substrate.

The substrate used in the method for producing an organic thin film of the present invention is not particularly limited for its material, shape, etc., while a substrate comprising a functional group that can interact with a molecule that forms an organic thin film in the organic solvent solution of the present invention, on the surface is preferred, and a substrate comprising an active hydrogen on the surface is particularly preferred. By using a substrate having an active hydrogen on the surface, a chemisorbed film can be easily formed on the substrate surface by a chemical interaction of the active hydrogen on the substrate surface and the molecule in the organic solvent solution of the present invention.

Active hydrogen relates to those that can easily dissociate as a proton. Examples of functional groups containing an active hydrogen include hydroxyl group (—OH), carboxyl group (—COOH), formyl group (—CHO), imino group (=NH), amino group (—$NH_2$), and thiol group (—SH), where hydroxyl group is preferred.

Substrates having a hydroxyl group on the substrate surface specifically include substrates consisting of metal such as aluminum, copper, stainless; glass; silicon wafer; ceramics; paper; natural fiber; leather; and other hydrophilic materials.

Even it is a substrate consisting of a material that does not have a hydroxyl group on the surface such as plastics or synthetic fiber, it can be suitably used by treating the substrate surface previously in a plasma atmosphere containing oxygen (for example at 100 W for 20 min.), or by introducing a hydrophilic group by conducting corona treatment. A surface treatment is not particularly necessary for a substrate consisting of polyamide resin or polyurethane resin, etc., as it comprises an imino group on its surface, and active hydrogens of the imino group and the alkoxy silyl group of the metal surfactant conduct a dealcoholization reaction to form a siloxane bond (—SiO—).

As for a substrate used in the method for producing an organic thin film of the present invention, a substrate consisting of at least one material selected from the group consisting of metal, glass, silicone wafer, ceramics, and plastic is preferred.

Further, when a substrate that does not have an active hydrogen on the surface is used, it is also possible to allow the substrate surface to contact previously with at least one compound selected from the group consisting of $SiCl_4$, $SiHCl_3$, $SiH_2Cl_2$, Cl—$(SiCl_2O)_b$—$SiCl_3$ (wherein b is a positive integer), and then to conduct a dehydrochlorination reaction to form a silica basic layer having an active hydrogen on the surface.

The method to allow the substrate to contact with the organic solvent solution is not particularly limited, and a known method can be used. Specific examples include, dipping method, spin coating method, spraying method, roller coat method, Mayer bar method, screen printing method, and brush coating method. Among these, dipping method is preferred. The step of allowing the substrate to contact with the organic solvent solution may be conducted at one time for a long time, or a brief coating may be conducted several times. Ultrasonic waves may be used to promote film formation.

The contact temperature is not particularly limited as long as it is a range within which the organic solvent solution of the present invention can maintain stability, and it is usually within the range from room temperature to the reflux temperature of the solvent used for preparing the solution. In order to obtain a suitable temperature for contact, the organic solvent solution of the present invention may be heated, or the substrate itself may be heated.

In the present invention, the step of allowing the substrate to contact with the organic solvent solution is preferred to be conducted in a space in which humidity is maintained at 40% RH or more, and more preferably in a space in which humidity is maintained at 60% RH or more. In such space, the water content in the organic solvent solution is more preferably maintained, and a dense monomolecular film may be formed with good reproducibility even when the substrate is in contact continuously.

The method for producing an organic thin film of the present invention may comprise an optional step besides the above-mentioned steps (A), (B), (C), (D), (E1), (E2), (E3), and (F2), as long as it does not interfere with the effect of the present invention.

(VI) Embodiment of the Organic Thin Film, and Use Thereof.

The organic thin film of the present invention may be an organic thin film which is none of a crystalline organic thin film, monomolecular film, chemisorbed film, or a self-assembled film. However, it is preferred to be a film that corresponds to 1 or 2 or more films selected from a crystalline organic thin film, monomolecular film, chemisorbed film or self-assembled film. It is more preferred to be a film corresponding to 2 or more films selected from the same.

The crystalline organic thin film of the present invention relates to an organic thin film wherein the metal surfactant having at least one or more hydrolysable group or hydroxyl group, contained in the organic solvent solution of the present invention, forms a repeat unit on the substrate surface. The monomolecular film of the present invention relates to a film wherein the molecules of the metal surfactant present in the plumb-bob vertical direction of the substrate are single molecules. The chemisorbed film of the present invention relates to a film wherein the metal surfactant molecule forming the film and the substrate surface are bound by chemical binding. The self-assembled film of the present invention relates to a film having a methodical structure without external forcing.

Whether a film such as crystalline organic thin film, monomolecular film, chemisorbed film, and self-assembled film can be obtained or not depends on the types of metal surfactant, the types of catalyst that can interact with the metal surfactant, and the material of the substrate used, etc. used in the method for producing an organic thin film of the present invention. However, an organic thin film of the present invention which is also an organic thin film being a crystalline organic thin film, monomolecular film, chemisorbed film, and self-assembled film etc. can be easily obtained by a known method.

The method for producing a monomolecular organic thin film of the present invention is not particularly limited. For example, it is preferred to use an organic solvent solution comprising a metal surfactant in which a hydrocarbonic oxy group or acyl oxy group is the hydrolysable group and a catalyst that can interact with the metal surfactant. It is preferred that the method comprises a step of applying the organic solvent solution on the substrate surface by at least one method selected from dipping method, spin coating method, rolling coating method, Mayer bar method, screen printing method, offset printing method, brush coating method and spraying method. It is more preferred to further comprise a step of dropping the organic solvent solution on the substrate, applying pressure to the dropped organic solvent solution from the side opposite of where the substrate is present to diffuse the organic solvent solution on the substrate. The amount of organic solvent solution to be dropped, or the site of the substrate where to drop the organic solvent solution, etc. is not particularly limited, and it may be appropriately selected according to the site or surface area of the substrate to form the monomolecular film.

The method for applying pressure to the dropped organic solvent solution from the side opposite of where the substrate is present is not particularly limited as long as it is a method of applying pressure to the dropped organic solvent solution from the side opposite of where the substrate is present, so that the dropped organic solvent solution disperses on the substrate, and specifically a method of piling films, sheets, or flat plates on the substrate surface where the organic solvent solution has been dropped, and rolling from the above with a roller, etc. can be exemplified.

The heat resistance of the organic thin film obtained by the method for producing an organic thin film of the present invention is not particularly limited as long as it is superior compared to that of an organic thin film obtained by a similar producing method except that it does not comprise the steps (E1), (E2) and (E3). For example, it is preferred that the contact angle of the organic thin film after heating at 250° C. for 10 min is 84% or more in case of water drop, and 25% or more in case of detradecane drop relative to the contact angle of the organic thin film before treatment; more preferably 87% or more in case of water drop, and 30% or more in case of tetradecane drop; and most preferably 90% or more in case of water drop, and 35% or more in case of tetradecane drop.

Moreover, the contact angle of the organic thin film obtained by the method for producing an organic thin film of the present invention after heating at 250° C. for 10 min, is preferred to be 92° or more in case of water drop, and 8° or more in case of tetradecane drop; more preferably 93° or more in case of water drop, and 10° or more in case of tetradecane drop; most preferably 94° or more in case of water drop, and 12° or more in case of tetradecance drop.

The organic thin film formed on the substrate surface in the present invention has excellent water repellency and oil repellency, and has excellent properties such as water resistance, corrosion resistance to aluminum, a function of preventing dirt showing, and thus can be advantageously used in various applications. For example, it can be applied to: communicating device, digital controlling device, and electric device incorporating thereof; magnetic recording media including hard disk, as well as magnetic tape, magnetic card, optical recording medium, magnetic recording medium and memory card; display (for example CRT, LCD, PDP, FED, ELD, etc.), touch panel, information terminal employing these; electroluminescence display device, electroluminescence device or electrode; insulating film, planarized film, protective film and transparent conductive film for a semiconductor device or liquid crystal device; thin film transistor (TFT) array, printing plate material, and metal mask used for printing, coating a desired pattern on the printing original plate using the printing plate material; bottle for beverages made by glass or plastic; fiber, cloth, paper; sealing part of rotating axis, agitating part such as clank, shaft, bearing, micromechanics, mechanical parts such as micromachine having self-lubricating property; humidity sensor; windows of buildings, cars, microwave, etc., front glass of vehicles, optical lenses, eyeglass lenses, goggles, helmet visor, eyeglass frame; demolding agent of dies, culture apparatus, microarrays, etc.

The present invention will be further explained by the Examples, while the technical scope of the present invention will not be limited to these exemplifications.

EXAMPLES

Example A

1. Preparation of Catalyst that can Interact with a Metal Surfactant 12.4 g of titanium tetraisopropoxide (purity: 99%; concentration in terms of titanium oxide: 28.2 wt %; Nippon Soda Co., LTd.) was dissolved into 45.0 g of toluene in a four-neck flask to conduct nitrogen gas substitution, and then the resultant was cooled down to −80° C. in a ethanol/liquid nitrogen bath. On the other hand, 1.26 g of ion exchange water ($H_2O$/Ti=1.6 (mol ratio)) was mixed with 11.3 g of isopropanol, and the resultant was dropped in the four-neck flask by stirring while being cooled at −80° C. to −70° C. While dropping, the liquid temperature in the flask was maintained from −80° C. to −70° C. After the termination of instillation, the resultant was stirred by cooling for 30 min and then the temperature was raised to room temperature by stirring, to obtain a partial hydrolyzed solution (catalyst solution), transparent and colorless, with a concentration of 5 wt % in terms of titanium oxide.

2. Preparation of Metal Surfactant 1 n-octadecyltrimethoxysilane (Gelest; hereinafter sometimes referred to as "ODS") was used as a metal surfactant for preparing a solution for producing an organic thin film.

3. Preparation of Organic Solvent Solution 1

The metal surfactant of the above 2. corresponding to a final concentration of 0.5 wt % was added to toluene which water content was 450 ppm, and stirred at room temperature for 30 min. Then, a catalyst solution of the above 1. corresponding to ¹⁄₁₀ fold mol (in terms of $TiO_2$) of the metal surfactant was dropped, and after the termination of instillation, the resultant was stirred at room temperature for 3 hours. Water was added to the resultant solution so that the water content becomes 500 ppm, to obtain an organic solvent solution.

2. Production of Organic Thin Film (ODS-Ni)

A nickel substrate (Ni mirror plate; Wakasa Electric Industry, Co., Ltd.) after ultrasonic cleaning and ozone cleaning, was immersed in the organic solvent solution obtained in the above 3. for 60 min, and then pulled-up. After performing ultrasonic cleaning with toluene, the treatment steps shown in Table 1 were conducted to produce an organic thin film (Examples 1 to 8).

On the other hand, as Comparative Example 1, an organic thin film to which a normal post-treatment was conducted, and as Comparative Example 2, an organic thin film exposed to isopropanol vapor and not moisture vapor were produced, respectively.

5. Measurement of Contact Angle of the Organic Thin Film (ODS-Ni)

The contact angle of pure water and tetradecane (TD) was measured for each of the organic thin film obtained in the above 4. The measurement of contact angle was performed with a contact angle meter (Kyowa Interface Science Co. Ltd.; "Drop Master 700"). The contact angles measured for each organic thin film are shown in Table 1.

TABLE 1

| | | Contact angle (°) | |
|---|---|---|---|
| Organic thin film | Post-treatment condition | water | TD |
| Comparative Example 1 | 60° C., 20 min | 109.5 | 34.7 |
| Example 1 (E1) | 100° C., 10 min | 110.2 | 37.5 |

TABLE 1-continued

| Organic thin film | Post-treatment condition | Contact angle (°) water | TD |
|---|---|---|---|
| Example 2 (E1) | 100° C., 20 min | 107.4 | 35.0 |
| Example 3 (E1) | 150° C., 20 min | 106.3 | 34.1 |
| Example 4 (E2) | Immersion in a warm water of 60° C. for 10 min | 106.5 | 33.7 |
| | Further 100° C., 10 min | 103.8 | 34.4 |
| Example 5 (E2) | Immersion in a warm water of 60° C. for 3 hours | 101.8 | 32.6 |
| | Further 100° C., 10 min | 102.8 | 32.6 |
| Example 6 (E3) | Exposure to moisture vapor (92° C.), 5 min | 106.0 | 34.0 |
| Example 7 (E3) | Exposure to moisture vapor (92° C.), 20 min | 104.5 | 36.9 |
| Example 8 (E3) | 100° C. (95% RH), 20 min | 109.1 | 35.4 |
| Comparative Example 2 | Exposure to IPA vapor (83° C.), 20 min | 105.3 | 32.8 |

TD: tetradecane
IPA: isopropanol

6. Heat Resistance Evaluation Test of Organic Thin Film (ODS-Ni)

In order to evaluate heat resistance of each organic thin film obtained in the above 4., each organic thin film was heated at 250° C. for 10 min, and then the contact angle of pure water and tetradecane (TD) was measured. The measurement of contact angle was performed with a contact angle meter (Kyowa Interface Science Co. Ltd.; "Drop Master 700"). The contact angles measured for each organic thin film are shown in Table 2. Among the organic thin films used for the heat resistance evaluation test, the organic thin films of Examples 4 and 5 were subjected to immersion treatment in warm water, but the additional treatment of 100° C., 10 min was not performed.

TABLE 2

| Organic thin film | Post-treatment condition | Contact angle water | TD |
|---|---|---|---|
| Comparative Example 1 | 60° C., 20 min | 92.7 | 7.7 |
| Example 1 (E1) | 100° C., 10 min | 93.5 | 10.1 |
| Example 2 (E1) | 100° C., 20 min | 93.4 | 10.8 |
| Example 3 (E1) | 150° C., 20 min | 94.8 | 12.2 |
| Example 4 (E2) | Immersion in a warm water of 60° C. for 10 min | 93.6 | 10.8 |
| Example 5 (E2) | Immersion in a warm water of 60° C. for 3 hours | 97.0 | 10.5 |
| Example 6 (E3) | Exposure to moisture vapor (92° C.), 5 min | 96.0 | 12.5 |
| Example 7 (E3) | Exposure to moisture vapor (92° C.), 20 min | 94.8 | 12.8 |
| Example 8 (E3) | 100° C. (95% RH), 20 min | 98.4 | 14.6 |
| Comparative Example 2 | Exposure to IPA vapor (83° C.), 20 min | 94.8 | 5.0 |

7. IR Measurement of Organic Thin Film (ODS-Ni)

IR was measured by infrared total reflection spectrometry (ATR method) for each organic thin film obtained in the above 4. The results of IR measurement were used to evaluate crosslinking or crystalline property of the organic thin film, by using the evaluation standard of the following Table 3.

TABLE 3

.920-930 $cm^{-1}$; unreacted Si—OH stretching vibration
When no peak exists within this range, it was considered to be a cross-link progression.
.850-1300 $cm^{-1}$; C—H bending vibration
When the peak within this range is sharp, it can be presumed that the conformation of the alkyl chain is fixed, and it was estimated that the crystalline property is high.
.2800-3000 $cm^{-1}$: $CH_2$ and $CH_3$ stretching vibration
When the half value width of each peak is large, it was evaluated that the crosslinking progression was developing.
When symmetric stretch vibration of $CH_3$ is observed in 2870-2876 $cm^{-1}$, it was evaluated that the crystalline property is high.

The evaluation of cross-linking or crystalline properties of the organic thin film using the evaluation standard of Table 3 are shown in Table 4.

TABLE 4

| Organic thin film | Post-treatment condition | Cross-link 920-930 $cm^{-1}$ | Crystalline property 850-1300 $cm^{-1}$ | Cross-link + crystalline property 2800-3000 $cm^{-1}$ |
|---|---|---|---|---|
| Comparative Example 1 | 60° C., 20 min | X | ○ | ○ |
| Example 1 (E1) | 100° C., 10 min | Δ | ○ | Δ |
| Example 2 (E1) | 100° C., 20 min | ○ | Δ | ○ |
| Example 3 (E1) | 150° C., 20 min | ○ | X | ○ |
| Example 4 (E2) | Immersion in a warm water of 60° C. for 10 min | ○ | X | Δ |
| | Further 100° C., 10 min | | ○ | ○ |
| Example 5 (E2) | Immersion in a warm water of 60° C. for 3 hours | ○ | X | Δ |
| | Further 100° C., 10 min | | ○ | ○ |
| Example 6 (E3) | Exposure to moisture vapor (92° C.), 5 min | ○ | ○ | ○ |
| Example 7 (E3) | Exposure to moisture vapor (92° C.), 20 min | ○ | ○ | ○ |
| Example 8 (E3) | 100° C. (95% RH), 20 min | ○ | ○ | ○ |
| Comparative Example 2 | Exposure to IPA vapor (83° C.), 20 min | X | X | X |

8. Comprehensive Evaluation of the Organic Thin Film (ODS-Ni)

The results of the above Tables 1, 2, and 4 were summarized in Table 5. When summarizing to Table 5, the results of Table 1 were evaluated in 3 grades, (⊚: water 107° or more, Tetradecane (TD) 34° or more, ○: mainly water 106° or more or TD 34° or more; Δ: below the above standards). The results of Table 2 were evaluated in 4 grades (⊚: water 97° or more, Tetradecane (TD) 13° or more, ○: mainly water 94° or more, TD 10.5° or more; Δ: water 92-94°, TD 10° or more; x: below the above standard)

TABLE 5

| Organic thin film | Post-treatment condition | Contact angle | Heat resistance | Cross-link | Crystalline property |
|---|---|---|---|---|---|
| Comparative Example 1 | 60° C., 20 min | ⊚ | X | X | ○ |
| Example 1 (E1) | 100° C., 10 min | ⊚ | Δ | Δ | ○ |
| Example 2 (E1) | 100° C., 20 min | ⊚ | ○ | ○ | Δ |
| Example 3 (E1) | 150° C., 20 min | ○ | ○ | ○ | X |
| Example 4 (E2) | Immersion in a warm water of 60° C. for 10 min | ○ | ○ | ○ | X |
| | Further 100° C., 10 min | ○ | ○ | ○ | ○ |
| Example 5 (E2) | Immersion in a warm water of 60° C. for 3 hours | Δ | ○ | ○ | X |
| | Further 100° C., 10 min | ○ | ○ | ○ | ○ |
| Example 6 (E3) | Exposure to moisture vapor (92° C.), 5 min | ○ | ○ | ○ | ○ |
| Example 7 (E3) | Exposure to moisture vapor (92° C.), 20 min | Δ | ○ | ○ | ○ |
| Example 8 (E3) | 100° C. (95% RH), 20 min | ⊚ | ⊚ | ○ | ○ |
| Comparative Example 2 | Exposure to IPA vapor (83° C.), 20 min | Δ | X | X | X |

As it can be seen from Table 5, the organic thin films of the Examples showed a superior heat resistance compared to the organic thin films of the Comparative Examples. Moreover, as the organic thin films of the Examples are excellent for cross-link and crystalline properties, it can be presumed that they have a superior durability compared to the organic thin films of the Comparative Examples. Furthermore, as for the organic thin films of Examples 4 and 5 produced by the production method comprising step (E2), it was shown that particularly the crystalline property was improved by immersing them into warm water and then treating at high temperature. The specific reason thereof is unclear, but it can be presumed that the extra water in the organic thin film was removed by immersing it into warm water and then treating at a high temperature, resulting in improvement of crystalline property.

Among the Examples, the organic thin film of Example 8 (treatment at high temperature, high humidity) was the most excellent.

9. Production of Organic Thin Film (ODS-Si)

A silicon substrate ("6-inch silicone wafer"; TOSHIBA Ceramics CO. Ltd.) after ultrasonic washing and ozone washing was immersed for 10 min in the organic solvent solution obtained in the above 3. and then pulled up. After performing ultrasonic washing with toluene, the post-treatments shown in Table 6 were performed to produce organic thin films (Examples 9 to 12). As Comparative Example 3, an organic thin film to which a normal post-treatment was performed was produced.

TABLE 6

| | Post-treatment | Contact angle (°) | |
|---|---|---|---|
| Organic thin film | conditions | water | TD |
| Comparative Example 3 | 60° C., 20 min | 109.6 | 36.9 |
| Example 9 (E1) | 100° C., 10 min | 110.9 | 39.6 |
| Example 10 (E1) | 100° C., 20 min | 110.6 | 36.6 |
| Example 11 (E2) | Immersion in a warm water of 60° C. for 3 hours | 106.1 | 34.3 |

TABLE 6-continued

| | Post-treatment | Contact angle (°) | |
|---|---|---|---|
| Organic thin film | conditions | water | TD |
| | Further 100° C., 10 min | 107.5 | 37.4 |
| Example 12 (E3) | 100° C. (95% RH), 20 min | 110.2 | 38.4 |

10. Heat Resistance Evaluation Test of Organic Thin Film (ODS-Si) 1

In order to evaluate heat resistance of each organic thin film obtained in the above 9., the organic thin films of Comparative Example 3, Examples 10 and 12 were heated at 270° C. for 10 min, and then the contact angle of water and tetradecane (TD) was measured. The measurement of contact angle was performed with a contact angle meter (Kyowa Interface Science Co. Ltd.; "Drop Master 700"). The contact angles measured for each organic thin film are shown in Table 7.

TABLE 7

| | Post-treatment | Contact angle (°) | |
|---|---|---|---|
| Organic thin film | conditions | water | TD |
| Comparative Example 3 | 60° C., 20 min | 91.2 | 9.4 |
| Example 10 (E1) | 100° C., 20 min | 90.5 | 16.1 |
| Example 12 (E3) | 100° C. (95% RH), 20 min | 89.1 | 19.0 |

11. Heat Resistance Evaluation Test of Organic Thin Film (ODS-Si) 2

In order to evaluate heat resistance of each organic thin film obtained in the above 9., the organic thin films of Comparative Example 3, Examples 9 and 11 were heated at 250° C. for 10 min, and then the contact angle of pure water and tetradecane (TD) was measured. The measurement of contact angle was performed with a contact angle meter (Kyowa Interface Science Co. Ltd.; "Drop Master 700"). The contact angles of each organic thin film are shown in Table 8.

TABLE 8

| Organic thin film | Post-treatment conditions | Contact angle (°) | |
|---|---|---|---|
| | | water | TD |
| Comparative Example 3 | 60° C., 20 min | 92.4 | 20.1 |
| Example 9 (E1) | 100° C., 10 min | 99.2 | 31.6 |
| Example 11 (E2) | Immersion in warm water of 60° C. for 3 hours | 98.5 | 27.6 |

12. Comprehensive Evaluation of Organic Thin Film (ODS-Si)

The results of the above Tables 6 to 8 were summarized in Table 9. When summarizing to Table 9, the results of Table 6 were evaluated in 3 grades, (⊚: water 107° or more, Tetradecane (TD) 34° or more, ○: water 106° or more, TD or more; Δ: below the above standards). The results of Table 7 were evaluated in 3 grades (⊚: Tetradecane (TD) or more, ○: TD 10.5° or more to about 16°; x: TD less than 10°). The results of Table 8 were evaluated in 3 grades (⊚: tetradecane (TD) 25° or more; ○: TD 10° or more, to about 20-25°; x: TD less than 20°).

TABLE 9

| Organic thin film | Post-treatment conditions | Contact angle | Heat resistance |
|---|---|---|---|
| Comparative Example 3 | 60° C., 20 min | ⊚ | X |
| Example 9 (E1) | 100° C., 10 min | ⊚ | ⊚ |
| Example 10 (E1) | 100° C., 20 min | ⊚ | ○ |
| Example 11 (E2) | Immersion in warm water of 60° C. for 3 hours | ○ | ⊚ |
| | Further 100° C., 10 min | ⊚ | ⊚ |
| Example 12 (E3) | 100° C. (95% RH), 20 min | ⊚ | ⊚ |

As it can be seen from Table 9, the organic thin films of the Examples showed a superior heat resistance compared to the organic thin films of the Comparative Examples. Furthermore, as for Example 11 produced by the production method comprising step (E2), it was shown that the contact angle was improved by immersing it into warm water and then treating at a high temperature. The specific reason thereof is unclear, but it can be presumed that the extra water in the organic thin film was removed by immersing it into warm water and then treating at a high temperature, resulting in improvement of contact angle. Among the Examples, the organic thin film of Example 12 (treatment at high temperature, high humidity) was the most excellent.

Example B

1. Preparation of Metal Surfactant 2

Fluoroalkylsilane (Gelest; hereinafter sometimes referred to as "FAS") was used as a metal surfactant for preparing a solution for producing an organic thin film.

2. Preparation of Organic Solvent Solution 2

The metal surfactant of the above 1. corresponding to a final concentration of 0.5 wt % was added to toluene which water content was 450 ppm, and stirred at room temperature for 30 min. Then, a catalyst solution of the above Example A-1. corresponding to $1/10$-fold mol (in terms of $TiO_2$) of the metal surfactant was dropped, and after the termination of instillation, the resultant was stirred at room temperature for 3 hours. Water was added to the resultant solution so that the water content becomes 500 ppm, to obtain an organic solvent solution.

3. Preparation of Organic Thin Film (FAS-Si)

A silicone substrate ("6-inch silicone wafer"; TOSHIBA Ceramics CO. Ltd.) after ultrasonic washing and ozone washing was immersed in the organic solvent solution obtained in the above 2. for 60 min and then pulled up. After performing the ultrasonic washing with toluene, the post-treatments shown in Table 10 were performed to produce organic thin films (Examples 13 to 15). As Comparative Example 4, an organic thin film to which a normal post-treatment was performed was produced.

4. Measurement of Contact Angle of Organic Thin Film (FAS-Si)

The contact angle of pure water and tetradecane (TD) was measured for each organic thin film obtained in the above 3. The measurement of contact angle was performed with a contact angle meter (Kyowa Interface Science Co. Ltd.; "Drop Master 700"). The contact angles of each organic thin film are shown in Table 10.

TABLE 10

| Organic thin film | Post-treatment conditions | Contact angle (°) | |
|---|---|---|---|
| | | water | TD |
| Comparative Example 4 | 60° C., 20 min | 108.2 | 65.1 |
| Example 13 (E1) | 100° C., 10 min | 108.2 | 65.1 |
| Example 14 (E2) | Warm water 60° C., 10 min | 107.0 | 67.5 |
| Example 15 (E2) | Warm water 60° C., 3 hrs | 105.8 | 60.3 |

5. Heat Resistance Evaluation Test of Organic Thin Film (FAS-Si)

In order to evaluate heat resistance of each organic thin film obtained in the above 3., the organic thin films of Comparative Example 4, Examples 13 to 15 were heated at 450° C. for 10 min, and then the contact angles of pure water and tetradecane (TD) were measured. The measurement of contact angle was performed with a contact angle meter (Kyowa Interface Science Co. Ltd.; "Drop Master 700"). The contact angles measured for each organic thin film are shown in Table 11.

TABLE 11

| Organic thin film | Post-treatment conditions | Contact angle (°) | |
|---|---|---|---|
| | | water | TD |
| Comparative Example 4 | 60° C., 20 min | 82.7 | 46.6 |
| Example 13 (E1) | 100° C., 10 min | 90.6 | 49.0 |
| Example 14 (E2) | Warm water 60° C., 10 min | 101.5 | 53.1 |
| Example 15 (E2) | Warm water 60° C., 3 hrs | 100.8 | 57.7 |

6. Comprehensive Evaluation of Organic Thin Film (FAS-Si)

The results of the above Tables 10 and 11 were summarized in Table 12. When summarizing to Table 12, the results of Table 10 were evaluated in 3 grades, (⊚: water or more, Tetradecane (TD) 65° or more, ○: water 106° or more, TD 63° or more; Δ: below the above standards). The results of Table 11 were evaluated in 4 grades (⊚: water 100° or more, Tetradecane (TD) 55° or more, ○: water 100° or more, TD about 50°; Δ: water 90° or more, TD 45° or more; x: water less than 90°, TD less than 50°).

TABLE 12

| Organic thin film | Post-treatment conditions | Contact angle | Heat resistance |
|---|---|---|---|
| Comparative Example 4 | 60° C., 20 min | ⊚ | X |
| Example 13 (E1) | 100° C., 10 min | ⊚ | Δ |
| Example 14 (E2) | Warm water 60° C., 10 min | ○ | ○ |
| Example 15 (E2) | Warm water 60° C., 3 hours | ○ | ⊚ |

As it can be seen from Table 12, the organic thin films of the Examples showed a superior heat resistance compared to the organic thin film of the Comparative Example.

7. Preparation of Organic Thin Film (FAS-Si)

A silicon substrate ("6-inch silicone wafer"; TOSHIBA Ceramics CO. Ltd.) treated with UV ozone was immersed in the organic solvent solution obtained in the above 2. for 30 min and then pulled up. After performing ultrasonic washing with toluene, the resultant was immersed in warm water of 60° C. for 10 min or 3 hours, to produce an organic thin film (Examples 16 and 17). As Comparative Example 5, an organic thin film to which a post-treatment was not performed was produced.

8. Heat Resistance Evaluation Test of Organic Thin Film (FAS-Si)

Figure 2:
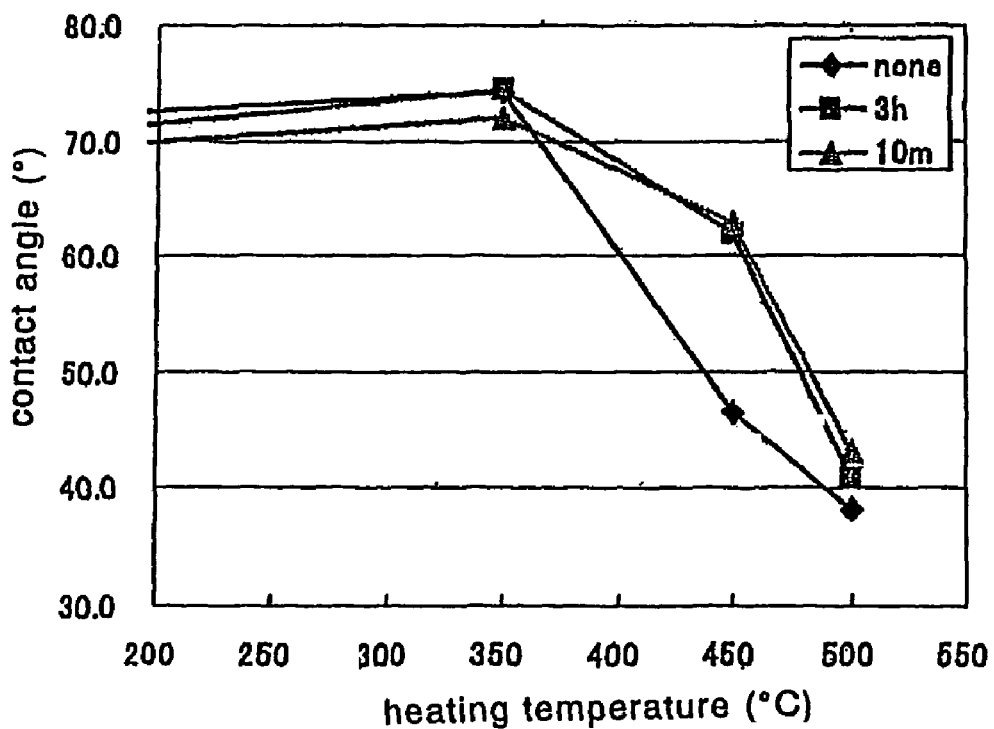
FIG. 2 is a graph showing the change of the contact angle of tetradecane (TD) on the organic thin film surface, with the difference of heating temperature, for the organic thin film obtained in Example B-7. In the graph, "none" denotes untreated, "3 h" denotes a 3 hour-immersion treatment in a warm water of 60° C., and "10 m" denotes a 10 min-immersion treatment in a warm water of 60° C.

In order to evaluate heat resistance of each organic thin film obtained in the above 7., the organic thin films of Comparative Example 5, Examples 16 and 17 were heated at 350° C., 450° C., and 500° C. respectively for 10 min, and then the contact angle of pure water and tetradecane (TD) was measured. The measurement of contact angle was performed with a contact angle meter (Kyowa Interface Science Co. Ltd.; "Drop Master 700"). The contact angles of each organic thin film are shown in FIGS. 1 and 2. The contact angles of both organic thin films immersed in a warm water of 60° C. for 10 min or 3 hours (Examples 16 and 17) showed a smaller decrease compared to that of untreated thin film (Comparative Example 5), and it was shown that they have excellent heat resistance.

9. ESCA Measurement of Organic Thin Film (FAS-Si)

Distribution of carbon and oxygen of the organic thin film obtained by immersing into a warm water of 60° C. for 10 min in the above 7. (Example 16) was measured by ESCA. The results are shown in Table 13. The organic thin film obtained by immersing into a warm water of 60° C. for 10 min (Example 16) showed a decrease in the presence ratio for both carbon atom and oxygen atom compared to untreated films (Comparative Example 5), it can be estimated that the hydrolyzation of the hydrolysable group of the metal surfactant was further progressed.

TABLE 13

| | Value: atom ratio (%) | |
|---|---|---|
| Element | Untreated (Comparative Example 5) | Treated (Example 16) |
| C | 23.6 | 22.6 |
| O | 26.8 | 23.9 |

INDUSTRIAL APPLICABILITY

The production method of organic thin film of the present invention can produce an excellent organic thin film which film properties are improved.

The invention claimed is:

1. A method for producing an organic thin film for forming an organic thin film on a substrate surface, comprising at least a step (B) of allowing the substrate to contact with an organic solvent solution comprising a metal surfactant having at least one or more hydrolysable group or hydroxyl group, and a catalyst that can interact with the metal surfactant, wherein the method further comprises after the step B, a step (E1) of heating the substrate which has been in contact with the organic solvent solution at 100° C. to 150° C.; a step (E2) of immersing the substrate which has been in contact with the organic solvent solution in a warm water of 40° C. or more and less than the boiling point; or a step (E3) of allowing the substrate which has been in contact with the organic solvent solution to contact with a moisture vapor of 60° C. to 150° C.

2. The method for producing an organic thin film according to claim 1, wherein the range of 60° C. to 150° C. in the step (E3) is a range of 80° C. to 130° C.

3. The method for producing an organic thin film according to claim 1, wherein the method further comprises after the step (E2), a step (F2) of heating the substrate that has been immersed in a warm water at 80° C. to 150° C.

4. The method for producing an organic thin film according to claim 3, wherein the range of 80° C. to 150° C. in the step (F2) is a range of 100° C. to 130° C.

5. The method for producing an organic thin film according to claim 1, wherein the method further comprises prior to the step (B), a step (A) of performing UV ozone treatment to the substrate.

6. The method for producing an organic thin film according to claim 1, wherein the method further comprises after the step (B), and prior to the step (E1), (E2) or (E3), a step (C) of washing the substrate with a hydrocarbonic organic solvent.

7. The method for producing an organic thin film according to claim 6, wherein the method further comprises between the step (C) and the step (E1), (E2), or (E3), a step (D) of removing the hydrocarbonic organic solvent attached to the substrate.

8. The method for producing an organic thin film according to claim 1, wherein at least one catalyst selected from the group consisting of metal oxide; metal hydroxide;
metal alkoxides, chelated or coordinated metal compound, partial hydrolyzed product of metal alkoxides, hydrolyzed product obtained by treating metal alkoxides with water in an amount equivalent to 2-fold or more of the metal alkoxides; organic acids; silanol condensation catalyst and acid catalyst; is used as the catalyst that can interact with the metal surfactant.

9. The method for producing an organic thin film according to claim 8, wherein at least one or more metal selected from the group consisting of titanium, zirconium, aluminum, silicon, germanium, indium, tin, tantalum, zinc, tungsten, and lead; is used as a metal of metal oxide, metal hydroxide, metal alkoxides, chelated or coordinated metal compounds, partial hydrolyzed product of metal alkoxides, or hydrolyzed product obtained by treating metal alkoxides with water in an amount equivalent to 2-fold or more of the metal alkoxides.

10. The method for producing an organic thin film according to claim 8, wherein a product having a property of being dispersed stably without being agglutinated in an organic solvent in the absence of acid, base and/or dispersion stabilizer, is used as a partial hydrolyzed product of metal alkoxides.

11. The method for producing an organic thin film according to claim 8, wherein a product obtained by hydrolyzing at a temperature range of −100° C. to the reflux temperature of the organic solvent, by using water in an amount of 0.5 to 2.0-fold mol relative to metal alkoxides in an organic solvent, is used as a partial hydrolyzed product of metal alkoxides.

12. The method for producing an organic thin film according to claim 8, wherein an organic acid having a pKa level of 1 to 6 is used as organic acid.

13. The method for producing an organic thin film according to claim 1, wherein a compound represented by formula (I) is used as a metal surfactant having at least one or more hydrolysable group or hydroxyl group,

(wherein $R^1$ represents a hydrocarbon group optionally having a substituent, a halogenated hydrocarbon group optionally having a substituent, a hydrocarbon group comprising a linking group, or a halogenated hydrocarbon group comprising a linking group; M represents at least one metal atom selected from the group consisting of silicon atom, germanium atom, tin atom, titanium atom and zirconium atom; X represents a hydroxyl group or hydrolysable group; n represents any integer of 1 to (m-1); m represents an atomic valence of M; when n is 2 or more, R1 may be the same or different; when (m-n) is 2 or more, X may be the same or different; with the proviso that at least one X among (m-n)×X is a hydrolysable group or hydroxyl group.

14. The method for producing an organic thin film according to claim 1, wherein a compound represented by formula (II) is used as a metal surfactant having at least one or more hydrolysable group or hydroxyl group,

(wherein M represents at least one metal atom selected from the group consisting of silicon atom, germanium atom, tin atom, titanium atom and zirconium atom; X represents a hydroxyl group or hydrolysable group; $R^2$ and $R^3$ independently represent a hydrogen atom or fluorine atom; $R^4$ represents an alkylene group, vinylene group, ethynylene group, arylene group, or a divalent linking group comprising a silicon atom and/or oxygen atom; Y represents a hydrogen atom, alkyl group, alkoxy group, fluorine-containing alkyl group or fluorine-containing alkoxy group; p represents 0 or a positive integer; q represents 0 or 1; r represents an integer of 0 to (m-2); when r is 2 or more, Y may be the same or different; when (m-r-1) is 2 or more, X may be the same or different; with the proviso that at least one X among (m-n-1)×X is a hydrolysable group or hydroxyl group).

15. The method for producing an organic thin film according to claim 13 or 14, wherein X is a hydrolysable group consisting of a halogen atom, C1-C6 alkoxy group, or acyloxy group.

16. The method for producing an organic thin film according to claim 1, wherein a hydrocarbonic solvent solution or fluorocarbonic solvent solution is used as an organic solvent solution.

17. The method for producing an organic thin film according to claim 1, wherein the organic thin film is a crystalline organic thin film.

18. The method for producing an organic thin film according to claim 1, wherein the organic thin film is a monomolecular film.

19. The method for producing an organic thin film according to claim 1, wherein the organic thin film is a chemisorbed film.

20. The method for producing an organic thin film according to claim 1, wherein the organic thin film is a self-assembled film.

21. The method for producing an organic thin film according to claim 1, wherein a substrate comprising an active hydrogen on the surface is used as a substrate.

22. The method for producing an organic thin film according to claim 1, wherein a substrate consisting of at least one selected from the group consisting of metal, glass, silicon wafer, ceramics, and plastic is used as a substrate.

23. The method for producing an organic thin film according to claim 1, wherein the substrate is not crystalline, and the organic thin film is crystalline.

24. The method for producing an organic thin film according to claim 1, wherein the step (B) is a step (B') of applying an organic solvent solution comprising a metal surfactant having at least one or more hydrolysable group or hydroxyl group, and a catalyst that can interact with the metal surfactant on the substrate by at least one method selected from dipping method, spin coating method, rolling coating method, Mayer bar method, screen printing method, offset printing method, brush coating method, and spraying method.

* * * * *